(12) United States Patent
Kim et al.

(10) Patent No.: US 12,556,206 B2
(45) Date of Patent: Feb. 17, 2026

(54) ELECTRONIC DEVICE FOR TRANSMITTING SRS TO WIRELESS COMMUNICATION NETWORK

(71) Applicant: SAMSUNG ELECTRONICS CO., LTD., Suwon-si (KR)

(72) Inventors: Jonghyuk Kim, Suwon-si (KR); Hyoseok Na, Suwon-si (KR); Yongjun An, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 747 days.

(21) Appl. No.: 17/902,370

(22) Filed: Sep. 2, 2022

(65) Prior Publication Data

US 2022/0416819 A1    Dec. 29, 2022

Related U.S. Application Data

(63) Continuation of application No. PCT/KR2020/018668, filed on Dec. 18, 2020.

(30) Foreign Application Priority Data

Mar. 4, 2020    (KR) .................. 10-2020-0026964

(51) Int. Cl.
*H04B 1/00* (2006.01)
*H01Q 1/50* (2006.01)
(Continued)

(52) U.S. Cl.
CPC ........... *H04B 1/0064* (2013.01); *H04B 1/401* (2013.01); *H04L 25/14* (2013.01); *H01Q 1/50* (2013.01); *H01Q 3/24* (2013.01); *H04L 5/0051* (2013.01)

(58) Field of Classification Search
CPC ...... H01Q 1/243; H01Q 1/50; H01Q 21/0006; H01Q 21/28; H01Q 3/24; H04B 1/00;
(Continued)

(56) References Cited

U.S. PATENT DOCUMENTS 8,885,748 B2    11/2014 Chang
10,454,550 B2   10/2019 Bai
(Continued)

FOREIGN PATENT DOCUMENTS

CN    108988903    12/2018
CN    109474291     3/2019
(Continued)

OTHER PUBLICATIONS

International Search Report dated Apr. 7, 2021 in International Application No. PCT/KR2020/018668.
(Continued)

*Primary Examiner* — Nguyen T Vo
(74) *Attorney, Agent, or Firm* — Nixon & Vanderhye, P.C.

(57) ABSTRACT

An example portable electronic device can include: a first antenna, a second antenna, and a third antenna; a first RFFE, a second RFFE, and a third RFFE which are configured to pre-process an RF signal; a first conductive wiring; a first switch including a (1-1)th terminal connected to the first antenna, a (1-2)th terminal connected to one end of the first conductive wiring, and a (1-3)th terminal connected to the first RFFE; a second switch including a (2-1)th terminal connected to the second antenna, a (2-2)th terminal connected to the third antenna, a (2-3)th terminal connected to the second RFFE, a (2-4)th terminal connected to the third RFFE, and a (2-5)th terminal connected to the other end of the first conductive wiring; an RFIC configured to convert RF signals inputted from the first RFFE, the second RFFE,
(Continued)

and the third RFFE into a baseband signal, and convert the baseband signal into an RF signal so as to output the RF signal to the first RFFE; and a communication processor configured to control the first switch so as to sequentially connect the (1-3)th terminal to the (1-1)th terminal and the (1-2)th terminal when the portable electronic device operates in a first transmission mode for transmitting a sounding reference signal (SRS) to the wireless communication network by using the first RFFE, and control the second switch so as to sequentially connect the (2-1)th terminal and the (2-2)th terminal to the (2-5)th terminal while the (1-2)th terminal is connected to the (1-3)th terminal.

15 Claims, 9 Drawing Sheets

(51) Int. Cl.
*H01Q 3/24* (2006.01)
*H04B 1/401* (2015.01)
*H04L 5/00* (2006.01)
*H04L 25/14* (2006.01)

(58) Field of Classification Search
CPC ........ H04B 1/0064; H04B 1/401; H04B 1/50; H04L 25/14; H04L 27/0002; H04L 5/0051
See application file for complete search history.

(56) References Cited

U.S. PATENT DOCUMENTS

| | | | |
|---|---|---|---|
| 10,998,924 | B2 | 5/2021 | Tsuda et al. |
| 2016/0066307 | A1 | 3/2016 | Huang et al. |
| 2016/0135180 | A1 | 5/2016 | Yuan et al. |
| 2016/0352373 | A1 | 12/2016 | Wloczysiak |
| 2017/0048717 | A1 | 2/2017 | Yoo et al. |
| 2017/0208568 | A1 | 7/2017 | Nam et al. |
| 2017/0264402 | A1 | 9/2017 | Papasakellariou |
| 2017/0264409 | A1 | 9/2017 | Guo et al. |
| 2018/0206253 | A1 | 7/2018 | Yun et al. |
| 2018/0242285 | A1 | 8/2018 | Yoo et al. |
| 2018/0262244 | A1 | 9/2018 | Noh et al. |
| 2018/0309599 | A1 | 10/2018 | Lee |
| 2018/0323855 | A1 | 11/2018 | Noh et al. |
| 2018/0343670 | A1 | 11/2018 | Park et al. |
| 2019/0058562 | A1 | 2/2019 | Yoo et al. |
| 2019/0097715 | A1 | 3/2019 | Maldonado et al. |
| 2019/0158236 | A1 | 5/2019 | Yoo et al. |
| 2019/0261363 | A1 | 8/2019 | Park et al. |
| 2020/0028562 | A1 | 1/2020 | Yang |
| 2020/0068409 | A1 | 2/2020 | Shin et al. |
| 2020/0337113 | A1 | 10/2020 | Na et al. |
| 2021/0159926 | A1 | 5/2021 | Kim et al. |
| 2021/0288676 | A1* | 9/2021 | Zhang ................ H04B 1/0067 |
| 2022/0123965 | A1* | 4/2022 | Brunel ................ H04B 7/024 |

FOREIGN PATENT DOCUMENTS

| | | |
|---|---|---|
| CN | 110535483 | 12/2019 |
| KR | 10-2016-0058716 | 5/2016 |
| KR | 10-2016-0133159 | 11/2016 |
| KR | 10-2017-0012153 | 2/2017 |
| KR | 10-2017-0019982 | 2/2017 |
| KR | 10-2017-0020187 | 2/2017 |
| KR | 10-2017-0020285 | 2/2017 |
| KR | 10-2017-0082493 | 7/2017 |
| KR | 10-2017-0105443 | 9/2017 |
| KR | 10-2017-0133147 | 12/2017 |
| KR | 10-2018-0045182 | 5/2018 |
| KR | 10-2018-0096729 | 8/2018 |
| KR | 10-2018-0096978 | 8/2018 |
| KR | 10-2018-0102322 | 9/2018 |
| KR | 10-2018-0116310 | 10/2018 |
| KR | 10-2018-0119381 | 11/2018 |
| KR | 10-2018-0122958 | 11/2018 |
| KR | 10-2018-0129458 | 12/2018 |
| KR | 10-2018-0134733 | 12/2018 |
| KR | 10-2019-0003797 | 1/2019 |
| KR | 10-2019-0019858 | 2/2019 |
| KR | 10-2019-0046158 | 5/2019 |
| KR | 10-2019-0056897 | 5/2019 |
| KR | 10-2019-0060520 | 6/2019 |
| KR | 10-2019-0086332 | 7/2019 |
| WO | 2019/151528 | 8/2019 |

OTHER PUBLICATIONS

Written Opinion dated Apr. 7, 2021 in International Application No. PCT/KR2020/018668.

* cited by examiner

US 12,556,206 B2

ELECTRONIC DEVICE FOR TRANSMITTING SRS TO WIRELESS COMMUNICATION NETWORK

CROSS-REFERENCE TO RELATED APPLICATIONS

This application is a continuation of International Application No. PCT/KR2020/018668 designating the United States, filed on Dec. 18, 2020, in the Korean Intellectual Property Receiving Office and claiming priority to Korean Patent Application No. 10-2020-0026964, filed on Mar. 4, 2020, in the Korean Intellectual Property Office, the disclosures of which are incorporated by reference herein in their entireties.

BACKGROUND

Field

The disclosure relates to an electronic device capable of supporting time division duplexing (TDD) and transmitting a sounding reference signal (SRS) via a wireless communication network.

Description of Related Art

A base station may measure the state of a channel with antennas included in an electronic device (terminal) using an SRS transmitted by the electronic device. The electronic device may include antennas (e.g., multi-input multi-output (MIMO) antennas) disposed to be physically spaced and a plurality of conductive wiring lines electrically connecting an RF transmission circuit to the antennas to transmit an SRS from the RF transmission circuit to the antennas.

SUMMARY

The number of transmission antennas for an SRS needs to be increased to increase data throughput of an SRS. However, employing a plurality of transmission wiring lines to increase the number of transmission antennas for an SRS may cause an increase in power loss (insertion loss (IL)) of an RF signal and IL imbalance between transmission wiring lines. Accordingly, data throughput may be reduced in an actual use environment. Further, a conductive wiring line needs to be installed in a manner of preventing interference between signals, which may cause a burden when designing a printed circuit board.

Various embodiments of the disclosure may provide an electronic device capable of increasing data throughput of an SRS by reducing the number of conductive wiring lines.

A portable electronic device according to various example embodiments may include: a first antenna, a second antenna, and a third antenna; a first RFFE, a second RFFE, and a third RFFE which are configured to preprocess an RF signal; a first conductive wiring line; a first switch including a (1-1)th terminal connected to the first antenna, a (1-2)th terminal connected to one end of the first conductive wiring line, and a (1-3)th terminal connected to the first RFFE; a second switch including a (2-1)th terminal connected to the second antenna, a (2-2)th terminal connected to the third antenna, a (2-3)th terminal connected to the second RFFE, a (2-4)th terminal connected to the third RFFE, and a (2-5)th terminal connected to another end of the first conductive wiring line; an RFIC configured to convert an RF signal input from the first RFFE, the second RFFE, and the third RFFE into a baseband signal, and convert a baseband signal into an RF signal to output the RF signal to the first RFFE; and a communication processor configured to control the first switch to sequentially connect the (1-3)th terminal to the (1-1)th terminal and the (1-2)th terminal, and control the second switch to sequentially connect the (2-1)th terminal and the (2-2)th terminal to the (2-5)th terminal while the (1-2)th terminal is connected to the (1-3)th terminal, when the portable electronic device operates in a first transmission mode for transmitting a sounding reference signal (SRS) to a wireless communication network using the first RFFE.

According to various example embodiments, the number of conductive wiring lines for connecting an RF transmission circuit and antennas may be reduced, thereby reducing a mounting area for conductive wiring lines, reducing power loss (e.g., IL reduction and reduction in IL imbalance between transmission wiring lines) of an SRS, and increasing data throughput of the SRS.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
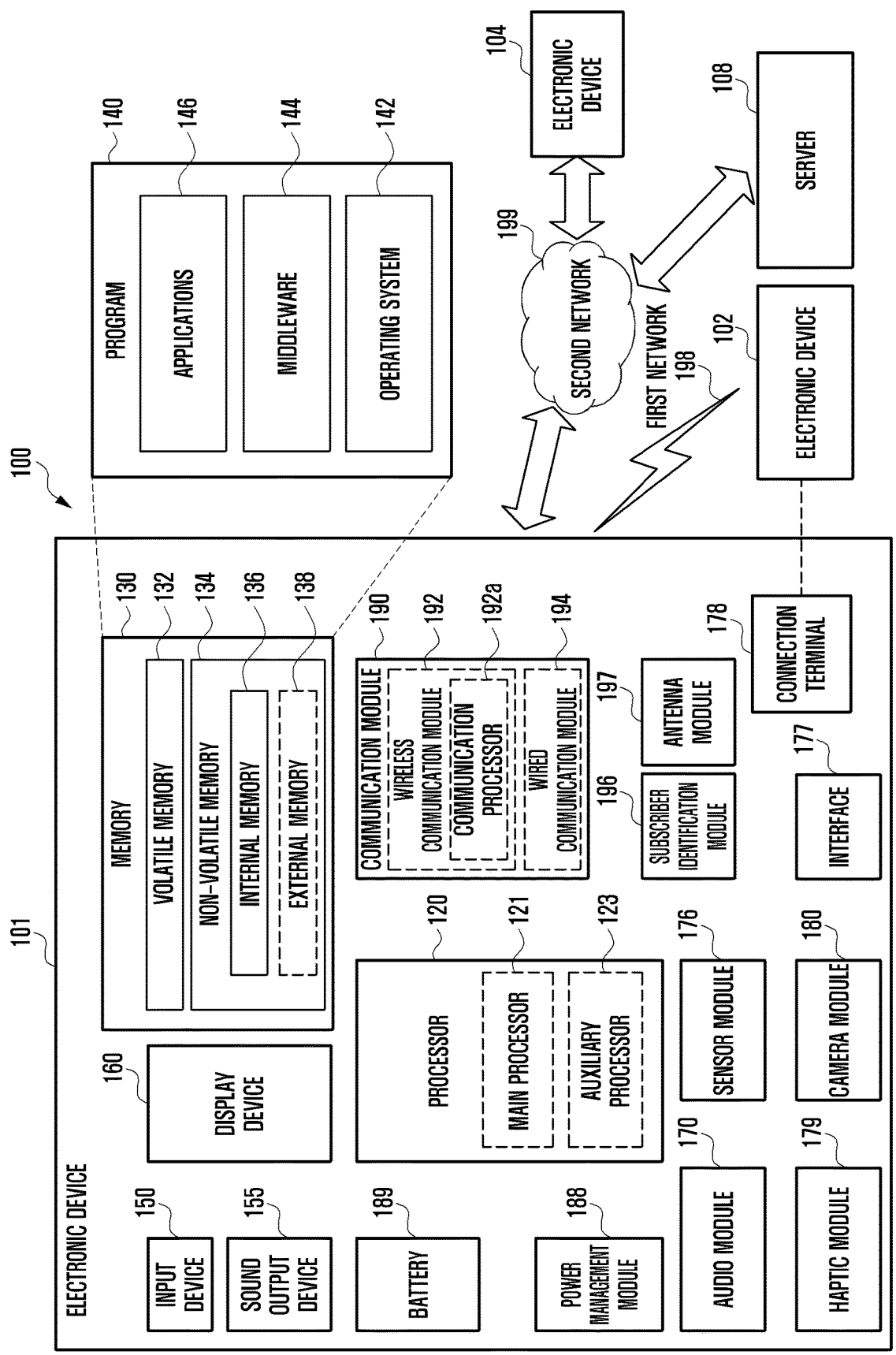
FIG. 1 is a block diagram of an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), or a sensor hub processor) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may a communication processor 192a supporting a wireless communication. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a diplexer) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
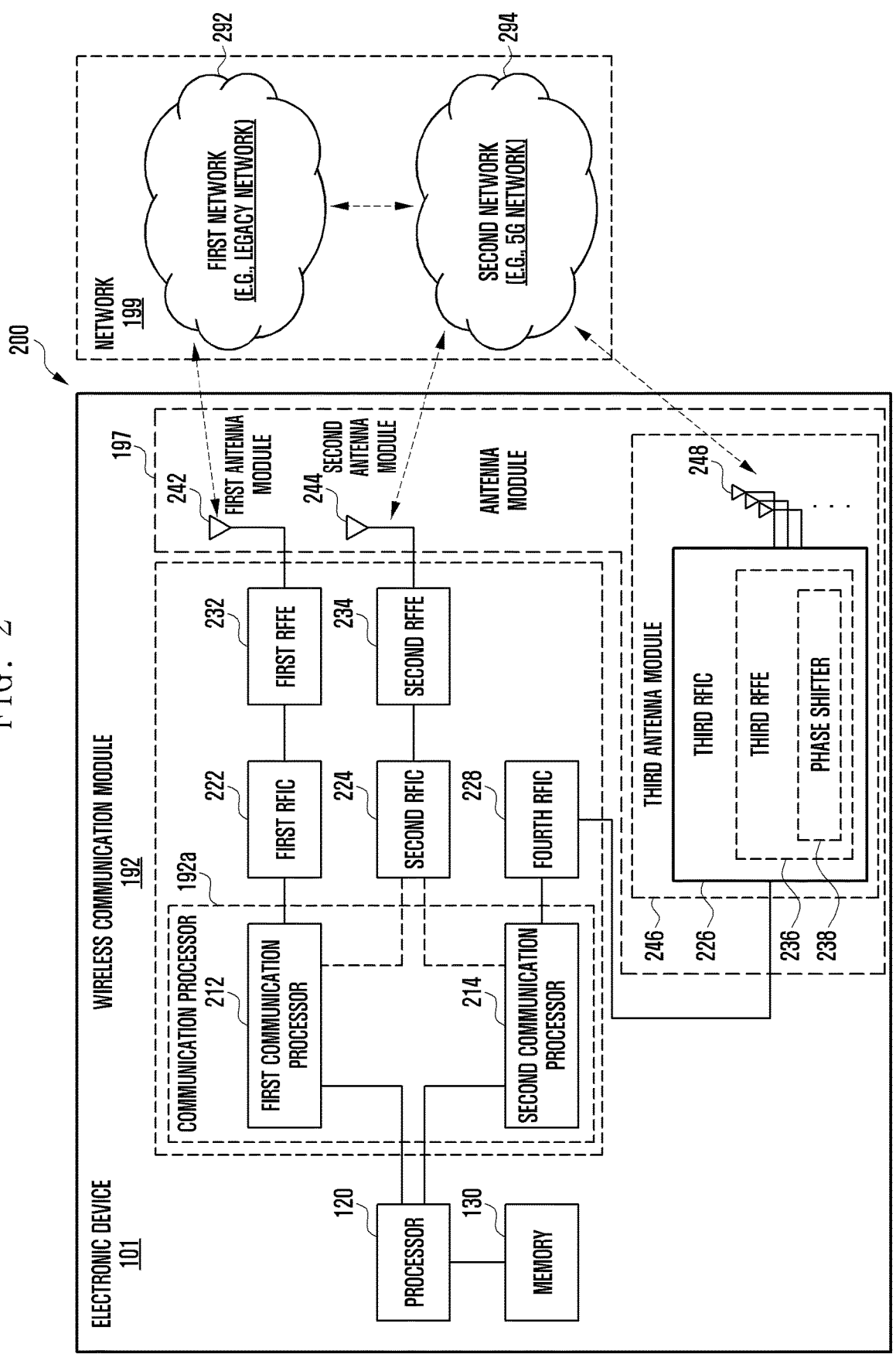
FIG. 2 is a block diagram of an example electronic device for supporting legacy network communication and 5G network communication according to various embodiments.

FIG. 2 is a block diagram 200 of an electronic device 101 for supporting legacy network communication and 5G network communication according to various embodiments. Referring to FIG. 2, the electronic device 101 may include a communication processor 192a, a first radio frequency integrated circuit (RFIC) 222, a second RFIC 224, a third RFIC 226, a fourth RFIC 228, a first radio frequency front end (RFFE) 232, a second RFFE 234, and an antenna module 197. The communication processor 192a may include a first communication processor 212 or a second communication processor 214. The antenna module 197 may include a first antenna module 242, a second antenna module 244, and/or a third antenna module 246. The electronic device 101 may further include a processor 120 and a memory 130. The network 199 may include a first network 292 and a second network 294. According to an embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or included as a part of the third RFIC 226.

The first communication processor 212 may support establishment of a communication channel in a band to be used for wireless communication with the first network 292, and legacy network communication through the established communication channel According to various embodiments, the first network may be a legacy network including a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and 5G network communication through the established communication channel According to various embodiments, the second network 294 may be a 5G network defined by third generation partnership project (3GPP). Additionally, according to an embodiment, the first communication processor 212 or the second communication processor 214 may support establishment of a communication channel corresponding to another designated band (for example, about 6 GHz or lower) among the bands to be used for wireless communication with the second network 294, and 5G network communication through the established communication channel. According to an embodiment, the first communication processor 212 and the second communication processor 214 may be implemented inside a single chip or a single package. According to various embodiments, the first communication processor 212 or the second communication processor 214 may be formed inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which is used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that is used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this case, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include only an access network (for example, 5G radio access network (RAN) or next-generation network (NG RAN)) and include no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
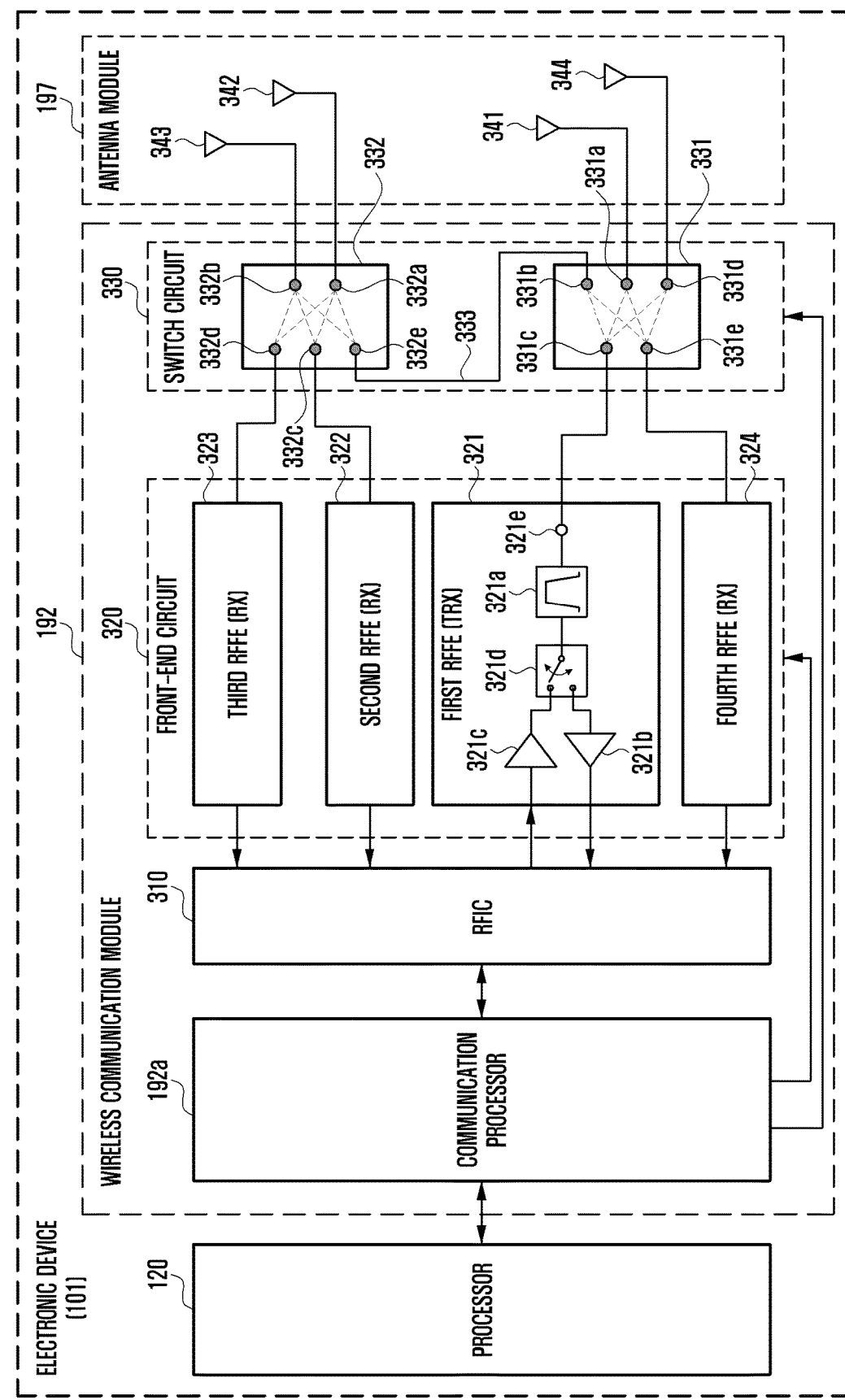
FIG. 3 a block diagram of an example electronic device configured to transmit an RF signal from antennas to a wireless communication network according to various embodiments.

FIG. 3 is a block diagram 300 of an example electronic device 101 configured to transmit an RF signal from antennas to a wireless communication network according to various embodiments. Descriptions overlapping that of FIG. 2 are not repeated or briefly made. Referring to FIG. 3, a wireless communication module 192 may include a communication processor 192a, an RFIC 310, a front-end circuit 320, and/or a switch circuit 330. An antenna module 197 may include a first antenna 341, a second antenna 342, a third antenna 343, and/or a fourth antenna 344. In an embodiment, the RFIC 310 and the front-end circuit 320 may be configured as one chip or may be included in one package. In another example, a processor 120 and the communication processor 192a may be configured as one chip or may be included in one package.

The RFIC 310 may receive a baseband signal from the communication processor 192a, and may convert the received baseband signal into an RF signal in a designated 5G sub-6 band. According to an embodiment, the RFIC 310 (e.g., the second RFIC 224 of FIG. 2) may convert the baseband signal into an RF signal in new radio (NR) frequency band 77 (N77) (about 3.3 to 4.2 GHz) or N79 (about 4.4 to 5 GHz), and may output the RF signal to the front-end circuit 320.

The RFIC 310 may receive an RF signal in the 5G sub-6 band from the front-end circuit 320. According to an embodiment, the RFIC 310 (e.g., the second RFIC 224 of FIG. 2) may receive an RF signal in n77 or n79 from the front-end circuit 320, may convert the received RF signal into a baseband signal, and may output the baseband signal to the communication processor 192a.

According to an embodiment, the front-end circuit 320 may include a plurality of RFFEs 321, 322, 323, and 324 configured to preprocess (e.g., amplify) RF signals in the same frequency band (e.g., n77 or n79). According to an embodiment, a first RFFE 321 may be connected to the first antenna 341 through the switch circuit 330, and may preprocess an RF signal received from a 5G network (e.g., the second network 294 of FIG. 2) through the first antenna 341 to output the RF signal to the RFIC 310. The first RFFE 321 may preprocess an RF signal (e.g., an SRS) received from the RFIC 310. In an embodiment, the first RFFE 321 may be sequentially connected to the antennas 341, 342, 343, and 344 through the switch circuit 330. For example, the antennas 341, 342, 343, and 344 may be antennas operating in multi-input multi-output (MIMO). The first RFFE 321 may transmit a preprocessed RF signal to a network 199 through an antenna connected through the switch circuit 330. A second RFFE 322 may be connected to the second antenna 342 through the switch circuit 330, and may preprocess an RF signal received from the network 199 through the second antenna 342 to output the RF signal to the RFIC 310. A third RFFE 323 may be connected to the third antenna 343 through the switch circuit 330, and may preprocess an RF signal received from the network 199 through the third antenna 343 to output the RF signal to the RFIC 310. A fourth RFFE 324 may be connected to the fourth antenna 344 through the switch circuit 330, and may preprocess an RF signal received from the network 199 through the fourth antenna 344 to output the RF signal to the RFIC 310.

The first RFFE 321 may operate in a reception mode or a transmission mode, based on a control signal received from the processor (e.g., the communication processor 192a). According to an embodiment, the first RFFE 321 is a component to process an RF signal before transmitting the RF signal to one of the antennas 341, 342, 343, and 344 or the RFIC 310, and may include, for example a band-pass filter (BPF) 321a, a first amplifier circuit 321b, a second amplifier circuit 321c, and/or a switch 321d. For example, the band-pass filter 321a (e.g., a surface acoustic wave (SAW) filter) may filter an RF signal received from an antenna to output an RF signal in a designated frequency band (e.g., N77 or N79) to the RFIC 310. The first amplifier circuit 321b (e.g., a low-noise amplifier or a variable gain amplifier) may amplify an RF signal having passed through the filter 321a, and may output the same to the RFIC 310. The second amplifier circuit 321c (e.g., a driver amplifier and/or a power amplifier) may amplify an RF signal received from the RFIC 310, and may output the same to the band-pass filter 321a. The switch 321d may connect the band-pass filter 321a to the first amplifier circuit 321b, based on a control signal received from the communication processor 192a, in the reception mode. The switch 321d may connect the band-pass filter 321a to the second amplification circuit 321c, based on a control signal received from the communication processor 192a, in the transmission mode. In an embodiment, the first RFFE 321 may further include circuitry 321e (e.g., a coupler) for obtaining power of an RF signal. For example, the circuitry 321e may be disposed on a conductive path connecting the band-pass filter 321a and a first switch 331, and may obtain power of an RF signal to output the power to another circuitry (e.g., the RFIC 310).

According to an embodiment, the second RFFE to the fourth RFFEs 322, 323, and 324 may operate in the reception mode, based on a control signal received from the processor (e.g., the communication processor 192a). For example, the second RFFE to the fourth RFFEs 322, 323, and 324 may include a BPF substantially the same as the band-pass filter 321a and an amplifier circuit substantially the same as the first amplifier circuit 321b, thus operating in the reception mode.

The switch circuit 330 may simultaneously perform connection between the first RFFE 321 and the first antenna 341, connection between the second RFFE 322 and the second antenna 342, connection between the third RFFE 323 and the third antenna 343, and connection between the fourth RFFE 324 and the fourth antenna 344, based on a control signal received from the communication processor 192a, when the electronic device 101 operates in the reception mode to receive an RF signal using the first RFFE to the fourth RFFEs 321, 322, 323, and 324. In an embodiment, when the electronic device 101 operates in the transmission mode to transmit an RF signal (e.g., an SRS) using the first RFFE 321, the switch circuit 330 may sequentially connect the first RFFE 321 to the first to fourth antennas 341, 342, 343, and 344, based on a control signal received from the communication processor 192a.

According to an embodiment, the switch circuit 330 may include the first switch 331, a second switch 332, and/or a conductive wiring line 333. The conductive wiring line 333 may connect the first switch 331 and the second switch 332.

According to an embodiment, the first switch 331 (e.g., a double-pole three-throw (DP3T) switch) may include a (1-1)th terminal 331a connected to the first antenna 341, a (1-2)th terminal 331b connected to one end of the conductive wiring line 333, a (1-3)th terminal 331c connected to the first RFFE 321, a (1-4)th terminal 331d connected to the fourth antenna 344, and a (1-5)th terminal 331e connected to the fourth RFFE 324. According to a control signal received from the communication processor 192a, one of the (1-1)th terminal 331a, the (1-2)th terminal 331b, and the (1-4)th terminal 331d may be electrically connected to one of the (1-3)th terminal 331c and the (1-5)th terminals 331e. For example, the (1-1)th terminal 331a, the (1-2)th terminal 331b, and the (1-4)th terminal 331d may be sequentially connected to the (1-3)th terminal 331c. In an embodiment, according to a control signal received from the communication processor 192a, two of the (1-1)th terminal 331a, the (1-2)th terminal 331b, and the (1-4)th terminal 331d may be electrically connected to the (1-3)th and (1-5)th terminals 331c and 331e at the same time. For example, according to a control signal received from the communication processor 192a, the (1-3)th terminal 331c may be connected to the (1-1)th terminal 331a, and the (1-5)th terminal 331e may be connected to the (1-4)th terminal 331d.

According to an embodiment, the second switch 332 (e.g., a three-pole double-throw (3PDT) switch) may include a (2-1)th terminal 332a connected to the second antenna 342, a (2-2)th terminal 332b connected to the third antenna 343, a (2-3)th terminal 332c connected to the second RFFE 322, a (2-4)th terminal 332d connected to the third RFFE 323, and/or a (2-5)th terminal 332e connected to another end of the conductive wiring line 333. In an embodiment, according to a control signal received from the communication processor 192a, one of the (2-1)th terminal 332a or the (2-2)th terminals 332b may be electrically connected to one of the (2-3)th, (2-4)th, or (2-5)th terminals 332c, 332d, and 332e. For example, the (2-1)th or (2-2)th terminals 332a or 332b may be sequentially connected to the (2-5)th terminal 332e. In another example, according to a control signal received from the communication processor 192a, the (2-4)th terminal 332d may be connected to the (2-2)th terminal 332b, and the (2-3)th terminal 331c may be connected to the (2-1)th terminal 332a.

According to an embodiment, in the reception mode, the first switch 331 may simultaneously perform connection between the (1-1)th terminal 331a and the (1-3)th terminal 331c and connection between the (1-4)th terminal 331d and (1-5)th terminal 331e, based on a control signal received from the communication processor 192a. In the reception mode, the second switch 332 may simultaneously perform connection between the (2-1)th terminal 332a and the (2-3)th terminal 332c and connection between the (2-2)th terminal 332b and the (2-4)th terminal 332d, based on a control signal received from the communication processor 192a.

According to an embodiment, in the transmission mode, the first switch 331 may sequentially connect the (1-3)th terminal 331c to the (1-1)th terminal 331a, the (1-2)th terminal 331b, and/or the (1-4)th terminal 331d, based on a control signal received from the communication processor 192a. In another example, in the transmission mode, the second switch 332 may sequentially connect the (2-5)th terminal 332e to the (2-1)th terminal 332a and/or the (2-2)th terminal 332b, based on a control signal received from the communication processor 192a.

According to an embodiment, the communication processor 192a may control the first RFFE 321 to operate in the reception mode or the transmission mode, and may control the second RFFE to the fourth RFFEs 322, 323, and 324 to operate in the reception mode. In an embodiment, when a separate control circuit is provided in the RFIC 310, this control operation may be performed by the control circuit instead of the communication processor 192a.

According to an embodiment, in the reception mode, the communication processor 192a may control the switch circuit 330 such that the connection between the (1-1)th terminal 331a and the (1-3)th terminal 331c, the connection between the (1-4)th terminal 331d and the (1-5)th terminal 331e, the connection between the (2-1)th terminal 332a and the (2-3)th terminal 332c, and the connection between the (2-2)th terminal 332b and the (2-4)th terminal 332d are simultaneously achieved. In an embodiment, this control operation may be performed by the control circuit provided in the RFIC 310 instead of the communication processor 192a.

According to an embodiment, in the transmission mode, the communication processor 192a may control the first switch 331 to sequentially connect the (1-3)th terminal 331c to the (1-1)th terminal 331a, the (1-2)th terminal 331b, and the (1-4)th terminal 331d. For example, the communication processor 192a may control the first switch 331 to connect the (1-1)th terminal 331a, the (1-2)th terminal 331b, and the (1-4)th terminal 331d to the (1-3)th terminal 331c in order. In an embodiment, this control operation may be performed by the control circuit provided in the RFIC 310 instead of the communication processor 192a.

According to an embodiment, in the transmission mode, the communication processor 192a may control the second switch 332 to sequentially connect the (2-5)th terminal 332e to the (2-1)th terminal 332a and the (2-2)th terminal 332b. For example, the communication processor 192a may control the second switch 332 to connect the (2-1)th terminal 332a and the (2-2)th terminal 332b to the (2-5)th terminal 332e in order while the (1-2)th terminal 331b is connected to the (1-3)th terminal 331c. In an embodiment, this control operation may be performed by the control circuit provided in the RFIC 310 instead of the communication processor 192a.

According to the circuit configuration of the switch circuit 330 and the foregoing control operation by the communication processor 192a (or RFIC 310), an RF signal (e.g., an SRS) in a designated frequency band (e.g., N77 or N79) may be sequentially transmitted from the first to fourth antennas 341, 342, 343, and 344 to the wireless communication network.

According to an embodiment, the fourth antenna 344 and the fourth RFFE 324 may be omitted from the electronic device 101. Accordingly, in the transmission mode, the communication processor 192a may control the first switch 331 to sequentially connect the (1-3)th terminal 331c to the (1-1)th terminal 331a and the (1-2)th terminal 331b, and may control the second switch 332 to sequentially connect the (2-1)th terminal 332a and the (2-2)th terminal 332b to the (2-5)th terminal 332e while the (1-2)th terminal 331b is connected to the (1-3)th terminal 331c.

Figure 4:
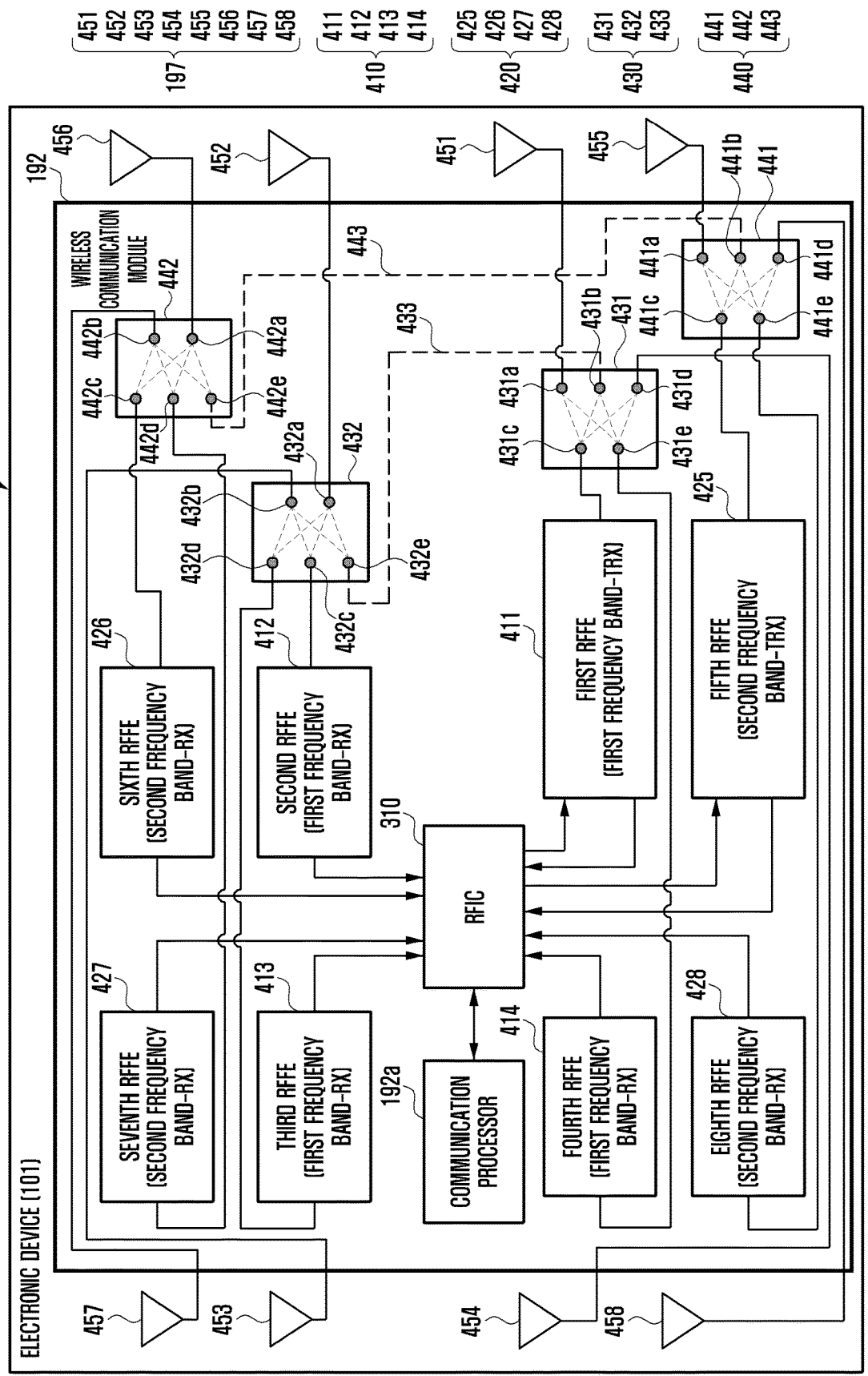
FIG. 4 is a block diagram of an example electronic device configured to transmit an RF signal in a first frequency band and an RF signal in a second frequency band to a wireless communication network according to various embodiments.

FIG. 4 is a block diagram 400 of an example electronic device 101 configured to transmit an RF signal in a first frequency band and an RF signal in a second frequency band to a wireless communication network according to various embodiments. Descriptions overlapping that of FIG. 3 are not repeated or briefly made.

Referring to FIG. 4, a wireless communication module 192 may include a communication processor 192a, an RFIC 310, a first front-end circuit 410, a second front-end circuit 420, a first switch circuit 430, and a second switch circuit 440. An antenna module 197 may include a first antenna 451, a second antenna 452, a third antenna 453, a fourth antenna 454, a fifth antenna 455, a sixth antenna 456, and a seventh antennas 457, and/or an eighth antenna 458.

According to an embodiment, the RFIC 310 may convert a baseband signal received from the communication processor 192a into an RF signal in a first frequency band (e.g., one of N77 and N79), and may output the RF signal to the first front-end circuit 410. The RFIC 310 may convert a baseband signal received from the communication processor 192a into an RF signal in a second frequency band (e.g., the other one of N77 and N79) different from the first frequency band, and may output the RF signal to the second front-end circuit 420.

According to an embodiment, the RFIC 310 may convert an RF signal in the first frequency band received from the first front-end circuit 410 into a baseband signal, and may output the baseband signal to the communication processor 192a. The RFIC 310 may convert an RF signal in the second frequency band received from the second front-end circuit 420 into a baseband signal, and may output the baseband signal to the communication processor 192a.

According to an embodiment, the first front-end circuit 410 may include first to fourth RFFEs 411, 412, 413, and 414 configured to preprocess an RF signal in the first frequency band. According to an embodiment, the first RFFE 411 (e.g., the first RFFE 321 of FIG. 3 including a first BPF which performs filtering to obtain an RF signal in the first frequency band) may be connected to the first antenna 451 through the first switch circuit 430, and may preprocess an RF signal received from a network (e.g., the second network 294 of FIG. 2) through the first antenna 451 to output the RF signal to the RFIC 310. The first RFFE 411 may preprocess an RF signal (e.g., an SRS) received from the RFIC 310.

According to an embodiment, the first RFFE 411 may be sequentially connected to the first to fourth antennas 451, 452, 453, and 454 through the first switch circuit 430. The first RFFE 411 may transmit the preprocessed RF signal to the 5G network through an antenna connected through the first switch circuit 430. The second RFFE 412 (e.g., the second RFFE 322 of FIG. 3 including the first BPF) may be connected to the second antenna 452 through the first switch circuit 430, and may preprocess an RF signal received from the network through the second antenna 452 to output the RF signal to the RFIC 310. The third RFFE 413 (e.g., the third RFFE 323 of FIG. 3 including the first BPF) may be connected to the third antenna 453 through the first switch circuit 430, and may preprocess an RF signal received from the network through the third antenna 453 to output the RF signal to the RFIC 310. The fourth RFFE 414 (e.g., the fourth RFFE 324 of FIG. 3 including the first BPF) may be connected to the fourth antenna 454 through the first switch circuit 430, and may preprocess an RF signal received from the network through the fourth antenna 454 to output the RF signal to the RFIC 310.

According to an embodiment, the second front-end circuit 420 may include fifth to eighth RFFEs 425, 426, 427, and 428 configured to preprocess an RF signal in the second frequency band. According to an embodiment, the fifth RFFE 425 (e.g., the first RFFE 321 of FIG. 3 including a second BPF which performs filtering to obtain an RF signal in the second frequency band) may be connected to the fifth antenna 455 through the second switch circuit 440, and may preprocess an RF signal received from the network (e.g., the second network 294 of FIG. 2) through the fifth antenna 455 to output the RF signal to the RFIC 310. The fifth RFFE 425 may preprocess an RF signal (e.g., an SRS) received from the RFIC 310. The fifth RFFE 425 may be sequentially connected to the fifth to eighth antennas 455, 456, 457, and 458 through the second switch circuit 440. The fifth RFFE 425 may transmit the preprocessed RF signal to the network through an antenna connected through the second switch circuit 440. The sixth RFFE 426 (e.g., the second RFFE 322 of FIG. 3 including the second BPF) may be connected to the sixth antenna 456 through the second switch circuit 440, and may preprocess an RF signal received from the network through the sixth antenna 456 to output the RF signal to the RFIC 310. The seventh RFFE 427 (e.g., the third RFFE 323 of FIG. 3 including the second BPF) may be connected to the seventh antenna 457 through the second switch circuit 440, and may preprocess an RF signal received from the network through the seventh antenna 457 to output the RF signal to the RFIC 310. The eighth RFFE 428 (e.g., the fourth RFFE 324 of FIG. 3 including the second BPF) may be connected to the eighth antenna 458 through the second switch circuit 440, and may preprocess an RF signal received from the network through the eighth antenna 458 to output the RF signal to the RFIC 310.

According to an embodiment, the first switch circuit 430 may include a first switch 431, a second switch 432, and/or a first conductive wiring line 433 to connect the first switch 431 and the second switch 432.

According to an embodiment, the first switch 431 (e.g., a DP3T switch) may include a (1-1)th terminal 431a connected to the first antenna 451, a (1-2)th terminal 431b connected to one end of the first conductive wiring line 433, a (1-3)th terminal 431c connected to the first RFFE 411, a (1-4)th terminal 431d connected to the fourth antenna 454, and a (1-5)th terminal 431e connected to the fourth RFFE 414. The second switch 432 (e.g., a 3PDT switch) may include a (2-1)th terminal 432a connected to the second antenna 452, a (2-2)th terminal 432b connected to the third antenna 453, a (2-3)th terminal 432c connected to the second RFFE 412, a (2-4)th terminal 432d connected to the third RFFE 413, and/or a (2-5)th terminal 432e connected to another end of the first conductive wiring line 433.

According to an embodiment, in a first reception mode for receiving an RF signal in the first frequency band, the first switch 431 may perform connection between the (1-1)th terminal 431a and the (1-3)th terminal 431c and/or connection between the (1-4)th terminal 431d and the (1-5)th terminal 431e, based on a control signal received from the communication processor 192a. In the first reception mode, the second switch 432 may perform connection between the (2-1)th terminal 432a and the (2-3)th terminal 432c and/or connection between the (2-2)th terminal 432b and the (2-4)th terminal 432d, based on a control signal received from the communication processor 192a.

According to an embodiment, in a first transmission mode for transmitting an RF signal (e.g., an SRS) in the first frequency band, the first switch 431 may sequentially connect the (1-3)th terminal 431c to the (1-1)th terminal 431a, the (1-2)th terminal 431b, and the (1-4)th terminal 431d, based on a control signal received from the communication processor 192a. In the first transmission mode, the second switch 432 may sequentially connect the (2-5)th terminal 432e to the (2-1)th terminal 432a and the (2-2)th terminal 432b, based on a control signal received from the communication processor 192a. In an embodiment, a connection order may be determined by the communication processor 192a (or the RFIC 310). For example, the communication processor 192a may control the first switch 431 to connect the (1-1)th terminal 431a, the (1-2)th terminal 431b, and the (1-4)th terminal 431d to the (1-3)th terminal 431c in order. The communication processor 192a may control the second switch 432 to connect the (2-1)th terminal 432a and the (2-2)th terminal 432b to the (2-5)th terminal 432e in order while the (1-2)th terminal 431b is connected to the (1-3)th terminal 431c.

According to an embodiment, an RF signal (e.g., an SRS) in the first frequency band may be sequentially transmitted from the first to fourth antennas 451, 452, 453, and 454 to a wireless communication network according to the circuit configuration of the first switch circuit 430 and the foregoing control operation by the communication processor 192a (or RFIC 310).

According to an embodiment, the second switch circuit 440 may include a third switch 441, a fourth switch 442, and a second conductive wiring line 443 to connect the third switch 441 and the fourth switch 442.

According to an embodiment, the third switch 441 (e.g., a DP3T switch) may include a (3-1)th terminal 441a connected to the fifth antenna 455, a (3-2)th terminal 441b connected to one end of the second conductive wiring line 443, a (3-3)th terminal 441c connected to the fifth RFFE 425, a (3-4)th terminal 441d connected to the eighth antenna 458, and/or a (3-5)th terminal 441e connected to the eighth RFFE 428. The fourth switch 442 (e.g., a 3PDT switch) may include a (4-1)th terminal 442a connected to the sixth antenna 456, a (4-2)th terminal 442b connected to the seventh antenna 457, a (4-3)th terminal 442c connected to the sixth RFFE 426, a (4-4)th terminal 442d connected to the seventh RFFE 427, and/or a (4-5)th terminal 442e connected to another end of the second conductive wiring line 443.

According to an embodiment, in a second reception mode for receiving an RF signal in the second frequency band, the third switch 441 may perform connection between the (3-1)th terminal 441a and the (3-3)th terminal 441c and/or connection between the (3-4)th terminal 441d and the (3-5)th terminal 441e, based on a control signal received from the communication processor 192a. In the second reception mode, the fourth switch 442 may perform connection between the (4-1)th terminal 442a and the (4-3)th terminal 442c and/or connection between the (4-2)th terminal 442b and the (4-4)th terminal 442d, based on a control signal received from the communication processor 192a.

According to an embodiment, in a second transmission mode for transmitting an RF signal (e.g., an SRS) in the second frequency band, the third switch 441 may sequentially connect the (3-3)th terminal 441c to the (3-1)th terminal 441a, the (3-2)th terminal 441b, and the (3-4)th terminal 441d, based on a control signal received from the communication processor 192a. In the second transmission mode, the fourth switch 442 may sequentially connect the (4-5)th terminal 442e to the (4-1)th terminal 442a and the (4-2)th terminal 442b, based on a control signal received from the communication processor 192a. In an embodiment, a connection order may be determined by the communication processor 192a (or the RFIC 310). For example, the communication processor 192a may control the third switch 441 to connect the (3-1)th terminal 441a, the (3-2)th terminal 441b, and the (3-4)th terminal 441d to the (3-3)th terminal 441c in order. The communication processor 192a may control the fourth switch 442 to connect the (4-1)th terminal 442a and the (4-2)th terminal 442b to the (4-5)th terminal 442e in order while the (3-2)th terminal 441b is connected to the (3-3)th terminal 441c.

According to an embodiment, an RF signal (e.g., an SRS) in the second frequency band may be sequentially transmitted from the fifth to eighth antennas 455, 456, 457, and 458 to the wireless communication network according to the circuit configuration of the second switch circuit 440 and the foregoing control operation by the communication processor 192a (or RFIC 310).

According to an embodiment, the fourth antenna 454 and the fourth RFFE 414 may be omitted from the electronic device 101. Accordingly, in the first transmission mode, the communication processor 192a may control the first switch 431 to sequentially connect the (1-3)th terminal 431c to the (1-1)th terminal 431a and the (1-2)th terminal 431b, and may control the second switch 432 to sequentially connect the (2-1)th terminal 432a and the (2-2)th terminal 432b to the (2-5)th terminal 432e while the (1-2)th terminal 431b is connected to the (1-3)th terminal 431c.

According to an embodiment, the eighth antenna 458 and the eighth RFFE 428 may be omitted from the electronic device 101. Accordingly, in the second transmission mode, the communication processor 192a may control the third switch 441 to sequentially connect the (3-3)th terminal 441c to the (3-1)th terminal 441a and the (3-2)th terminal 441b, and may control the fourth switch 442 to sequentially connect the (4-1)th terminal 442a and the (4-2)th terminal 442b to the (4-5)th terminal 442e while the (3-2)th terminal 441b is connected to the (3-3)th terminal 441c.

Figure 5:
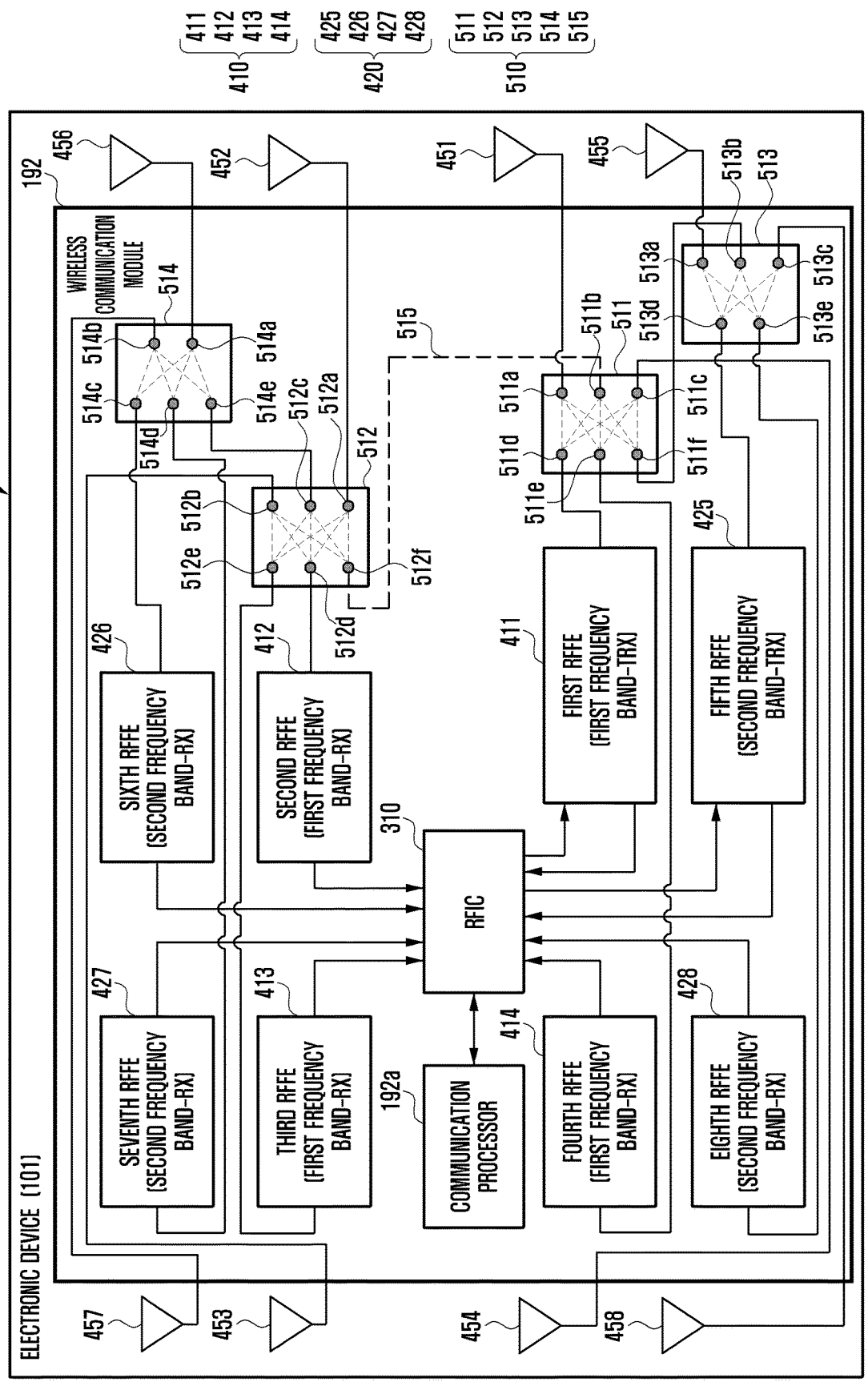
FIG. 5 is a block diagram of an example electronic device configured to transmit an RF signal in a first frequency band and an RF signal in a second frequency band to a wireless communication network according to various embodiments.

FIG. 5 is a block diagram 500 of an example electronic device 101 configured to transmit an RF signal in a first frequency band and an RF signal in a second frequency band to a wireless communication network according to various embodiments. Descriptions overlapping those of FIG. 4 are not repeated or briefly made. Referring to FIG. 5, a wireless communication module 192 may include a communication processor 192a, an RFIC 310, a first front-end circuit 410, a second front-end circuit 420, and a switch circuit 510.

According to an embodiment, in a first reception mode, the switch circuit 510 may simultaneously perform connection between a first RFFE 411 and a first antenna 451, connection between a second RFFE 412 and a second antenna 452, connection between a third RFFE 413 and a third antenna 453, and connection between a fourth RFFE 414 and a fourth antenna 454, based on a control signal received from the communication processor 192a. In a second reception mode, the switch circuit 510 may simultaneously perform connection between a fifth RFFE 425 and a fifth antenna 455, connection between a sixth RFFE 426 and a sixth antenna 456, connection between a seventh RFFE 427 and a seventh antenna 457, and connection between an eighth RFFE 428 and an eighth antenna 458, based on a control signal received from the communication processor 192a.

According to an embodiment, in a first transmission mode, the switch circuit 510 may sequentially connect the first RFFE 411 to the first to fourth antennas 451, 452, 453, and 454, based on a control signal received from the communication processor 192a. In the second transmission mode, the switch circuit 510 may sequentially connect the fifth RFFE 425 to the fifth to eighth antennas 455, 456, 457, and 458, based on a control signal received from the communication processor 192a.

According to an embodiment, the switch circuit 510 may include a first switch 511, a second switch 512, a third switch 513, a fourth switch 514, and/or a conductive wiring line 515.

According to an embodiment, the first switch 511 (e.g., a 3P3T switch) may include a (1-1)th terminal 511a connected to the first antenna 451, a (1-2)th terminal 511b connected to one end of the conductive wiring line 515, a (1-3)th terminal 511c connected to the fourth antenna 454, a (1-4)th terminal 511d connected to the first RFFE 411, a (1-5)th terminal 511e connected to the fourth RFFE 414, and/or a (1-6)th terminal 511f connected to the third switch 513. One of the (1-1)th to (1-3)th terminals 511a, 511b, and 511c may be electrically connected to one of the (1-4)th to (1-6)th terminals 511d, 511e, and 511f according to a control signal received from the communication processor 192a. For example, the (1-1)th to (1-3)th terminals 511a, 511b, and 511c may be sequentially connected to the (1-4)th terminal 511d. In another example, according to a control signal received from the communication processor 192a, the (1-4)th terminal 511d may be connected to the (1-1)th terminal 511a, and the (1-5)th terminal 511e may be connected to the (1-3)th terminal 511c.

According to an embodiment, the second switch 512 (e.g., a 3P3T switch) may include a (2-1)th terminal 512a connected to the second antenna 452, a (2-2)th terminal 512b connected to the third antenna 453, a (2-3)th terminal 512c connected to the fourth switch 514, a (2-4)th terminal 512d connected to the second RFFE 412, a (2-5)th terminal 512e connected to the third RFFE 413, and/or a (2-6)th terminal 512f connected to another end of the conductive wiring line 515. One of the (2-1)th to (2-3)th terminals 512a, 512b, and 512c may be electrically connected to one of the (2-4)th to (2-6)th terminals 512d, 512e, and 512f according to a control signal received from the communication processor 192a. For example, the (2-1)th terminal 512a or the (2-2)th terminal 512b may be sequentially connected to the (2-6)th terminal 512f while the (1-2)th terminal 511b of the first switch 511 is connected to the (1-4)th terminal 511d. In another example, according to a control signal received from the communication processor 192a, the (2-4)th terminal 512d may be connected to the (2-1)th terminal 512a, and the (2-5)th terminal 512e may be connected to the (2-2)th terminal 512b.

According to an embodiment, the third switch 513 (e.g., a DP3T switch) may include a (3-1)th terminal 513a connected to the fifth antenna 455, a (3-2)th terminal 513*b* connected to the (1-6)th terminal 511*f* of the first switch 511, a (3-3)th terminal 513*c* connected to the eighth antenna 458, a (3-4)th terminal 513*d* connected to the fifth RFFE 425, and/or a (3-5)th terminal 513*e* connected to the eighth RFFE 428. One of the (3-1)th to (3-3)th terminals 513*a*, 513*b*, and 513*c* may be electrically connected to one of the (3-4)th 513*d* terminal or the (3-5)th terminal 513*f* according to a control signal received from the communication processor 192*a*. For example, the (3-1)th to (3-3)th terminals 513*a*, 513*b*, and 513*c* may be sequentially connected to the (3-4)th terminal 513*d*. In another example, according to a control signal received from the communication processor 192*a*, the (3-4)th terminal 513*d* may be connected to the (3-1)th terminal 513*a*, and the (3-5)th terminal 513*e* may be connected to the (3-3)th terminal 513*c*.

According to an embodiment, the fourth switch 514 (e.g., a 3PDT switch) may include a (4-1)th terminal 514*a* connected to the sixth antenna 456, a (4-2)th terminal 514*b* connected to the seventh antenna 457, a (4-3)th terminal 514*c* connected to the sixth RFFE 426, a (4-4)th terminal 514*d* connected to the seventh RFFE 427, and a (4-5)th terminal 514*e* connected to the (2-3)th terminal 512*c* of the second switch 512. One of the (4-1)th terminal 514*a* or the (4-2)th terminal 514*b* may be electrically connected to one of the (4-3)th to (4-5)th terminals 514*c*, 514*d*, and 514*e* according to a control signal received from the communication processor 192*a*. For example, the (4-1)th terminal 514*a* or the (4-2)th terminal 514*b* may be sequentially connected to the (4-5)th terminal 514*e* while the (3-4)th terminal 513*d* of the third switch 513 is connected to the (3-2)th terminal 513*b*, the (1-6)th terminal 511*f* of the first switch 511 is connected to the (1-2)th terminal 511*b*, and the (2-6)th terminal 512*f* of the second switch 512 is connected to the (2-3)th terminal 512*c*. In another example, according to a control signal received from the communication processor 192*a*, the (4-3)th terminal 514*c* may be connected to the (4-1)th terminal 514*a*, and the (4-4)th terminal 514*d* may be connected to the (4-2)th terminal 514*b*.

According to an embodiment, in the first reception mode, the communication processor 192*a* may control the switches 511 and 512 to connect the (1-1)th terminal 511*a* and the (1-4)th terminal 511*d*, connect the (1-3)th terminal 511*c* and the (1-5)th terminal 511*e*, connect the (2-1)th terminal 512*a* and the (2-4)th terminal 512*d*, and/or connect the (2-2)th terminal 512*b* and the (2-5)th terminal 512*e*.

According to an embodiment, in the second reception mode, the communication processor 192*a* may control the switches 513 and 514 to connect the (3-1)th terminal 513*a* and the (3-4)th terminal 513*d*, connect the (3-3)th terminal 513*c* and the (3-5)th terminal 513*e*, connect the (4-1)th terminal 514*a* and the (4-3)th terminal 514*c*, and/or connect the (4-2)th terminal 514*b* and the (4-4)th terminal 514*d*.

According to an embodiment, in the first transmission mode, the communication processor 192*a* may control the first switch 511 so that the (1-1)th to (1-3)th terminals 511*a*, 511*b*, and 511*c* are sequentially connected to the (1-4)th terminal 511*d*. In the first transmission mode, the communication processor 192*a* may control the second switch 512 so that the (2-1)th terminal 512*a* or the (2-2)th terminal 512*b* is sequentially connected to the (2-6)th terminal 512*f* while the (1-2)th terminal 511*b* of the first switch 511 is connected to the (1-4)th terminal 511*d*. According to the foregoing control operation, an RF signal (e.g., an SRS) in the first frequency band may be sequentially transmitted from the first to fourth antennas 451, 452, 453, and 454 to the wireless communication network.

According to an embodiment, in the second transmission mode, the communication processor 192*a* may control the switches 511 and 512 so that the (1-6)th terminal 511*f* is connected to the (1-2)th terminal 511*b* and the (2-6)th terminal 512*f* is connected to the (2-3)th terminal 512*c*, and may control the third switch 513 so that the (3-1)th to (3-3)th terminals 513*a*, 513*b*, and 513*c* are sequentially connected to the (3-4)th terminal 513*d*. In the second transmission mode, the communication processor 192*a* may control the fourth switch 514 so that the (4-1)th terminal 514*a* or the (4-2)th terminal 514*b* is sequentially connected to the (4-5)th terminal 514*e* while the (3-4)th terminal 513*d* is connected to the (3-2)th terminal 513*b*, the (1-6)th terminal 511*f* is connected to the (1-2)th terminal 511*b*, and the (2-6)th terminal 512*f* is connected to the (2-3)th terminal 512*c*. According to the foregoing control operation, an RF signal (e.g., an SRS) in the second frequency band may be sequentially transmitted from the fifth to eighth antennas 455, 456, 457, and 458 to the wireless communication network.

Figure 6:
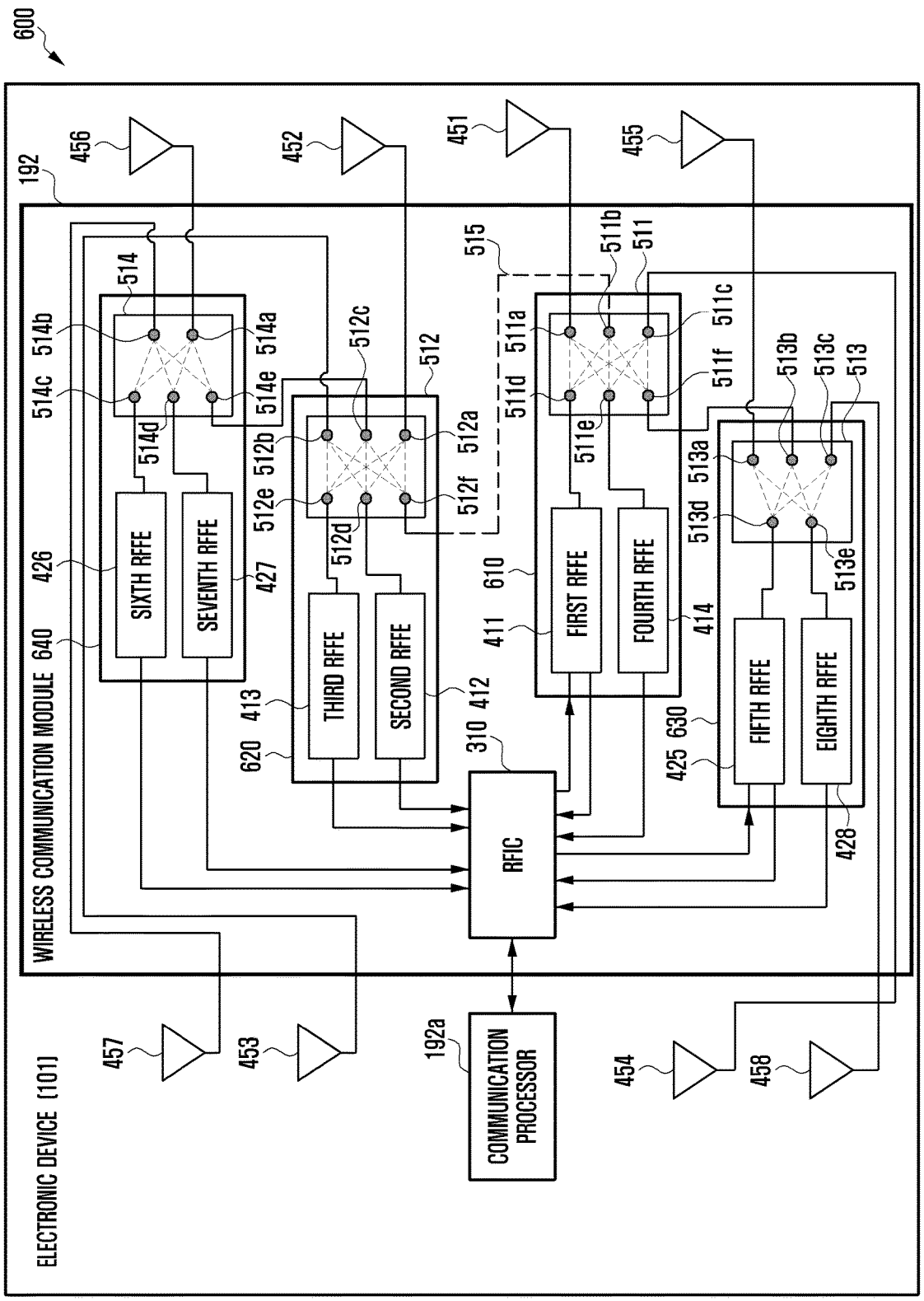
FIG. 6 is a block diagram of an example electronic device configured to transmit an RF signal in a first frequency band and an RF signal in a second frequency band to a wireless communication network according to various embodiments.

FIG. 6 is a block diagram 600 of an example electronic device 101 configured to transmit an RF signal in a first frequency band and an RF signal in a second frequency band to a wireless communication network according to various embodiments.

A wireless communication module 192 of FIG. 6 may include switches 511, 512, 513, and 514. According to an embodiment, one switch may be integrated with a plurality of RFFEs into one module (e.g., a single chip). According to an embodiment, a first RFFE 411, a fourth RFFE 414, and a first switch 511 may be configured as a first front-end module 610. A second RFFE 412, a third RFFE 413, and a second switch 512 may be configured as a second front-end module 620. A fifth RFFE 425, an eighth RFFE 428, and a third switch 513 may be configured as a third front-end module 630. A sixth RFFE 426, a seventh RFFE 427, and a fourth switch 514 may be configured as a fourth front-end module 640.

According to an embodiment, in a first transmission mode, a communication processor 192*a* may control the first switch 511 so that (1-1)th to (1-3)th terminals 511*a*, 511*b*, and 511*c* are sequentially connected to a (1-4)th terminal 511*d*, and the second front-end module 620 may control the second switch 512 so that a (2-1)th terminal 512*a* or a (2-2)th terminal 512*b* is sequentially connected to a (2-6)th terminal 512*f* while a (1-2)th terminal 511*b* of the first switch 511 is connected to the (1-4)th terminal 511*d*. According to the foregoing control operation, an RF signal (e.g., an SRS) in the first frequency band may be sequentially transmitted from first to fourth antennas 451, 452, 453, and 454 to the wireless communication network.

According to an embodiment, in a second transmission mode, the communication processor 192*a* may control the first switch 511 so that a (1-6)th terminal 511*f* is connected to the (1-2)th terminal 511*b*, may control the second switch 512 so that a (2-6)th terminal 512*f* is connected to a (2-3)th terminal 512*c*, and may control the third switch 513 so that (3-1)th to (3-3)th terminals 513*a*, 513*b*, and 513*c* are sequentially connected to a (3-4)th terminal 513*d*. The communication processor 192*a* may control the fourth switch 514 so that a (4-1)th terminal 514*a* or a (4-2)th terminal 514*b* is sequentially connected to a (4-5)th terminal 514*e* while the (3-4)th terminal 513*d* is connected to the (3-2)th terminal 513*b*, the (1-6)th terminal 511*f* is connected to the (1-2)th terminal 511*b*, and the (2-6)th terminal 512*f* is connected to the (2-3)th terminal 512*c*. According to the foregoing control operation, an RF signal (e.g., an SRS) in the second frequency band may be sequentially transmitted from fifth to eighth antennas 455, 456, 457, and 458 to the wireless communication network.

Figure 7:
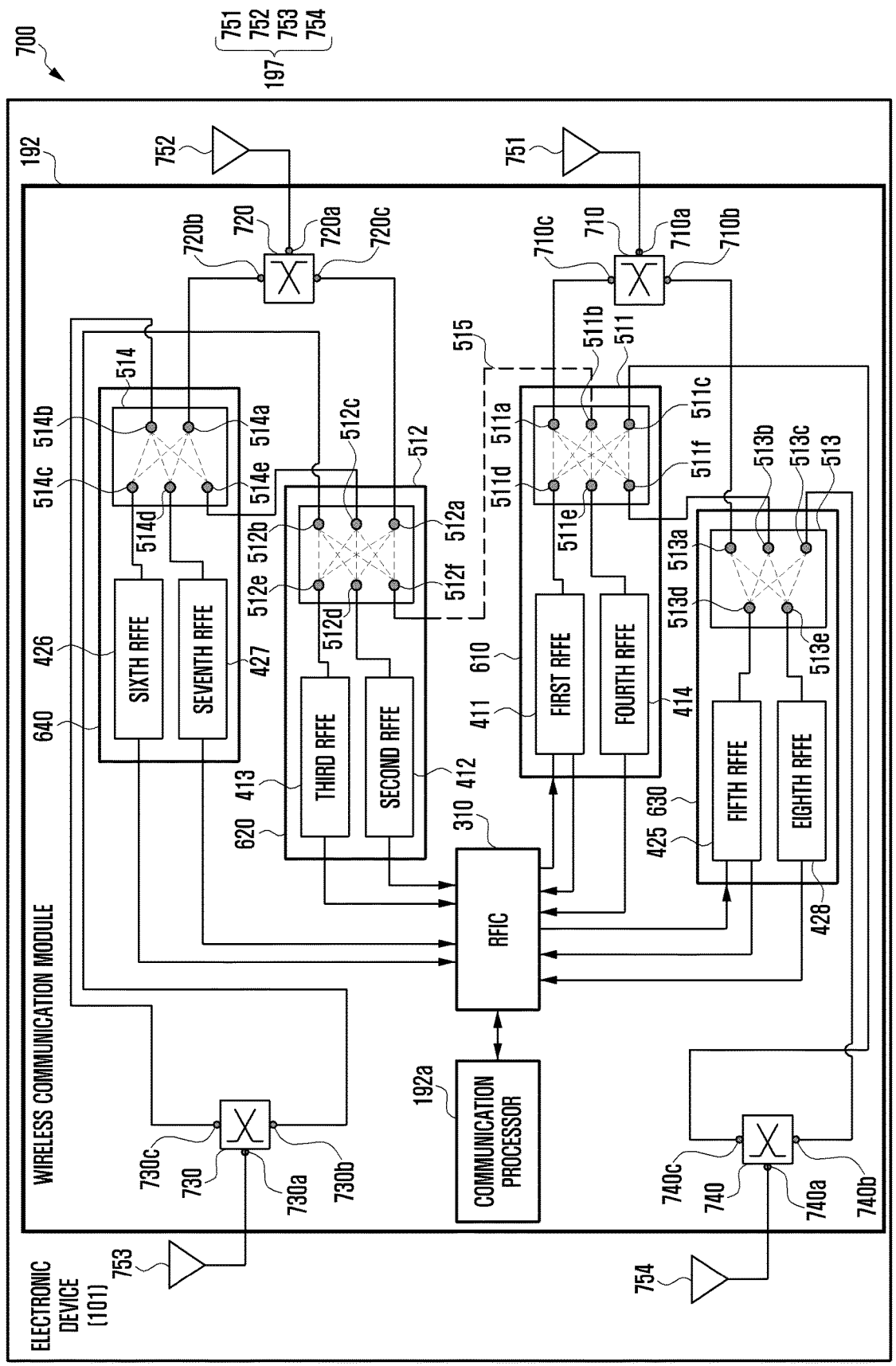
FIG. 7 is a block diagram of an example electronic device configured to transmit an RF signal in a first frequency band and an RF signal in a second frequency band to a wireless communication network according to various embodiments.

FIG. 7 is a block diagram 700 of an example electronic device 101 configured to transmit an RF signal in a first frequency band and an RF signal in a second frequency band to a wireless communication network according to various embodiments. Descriptions overlapping those of FIG. 6 are not repeated or briefly made.

Referring to FIG. 7, a wireless communication module 192 according to an embodiment may include circuitry, for example, a diplexer, which separates RF signals according to each frequency band, and thus at least some of antennas may be commonly used. According to an embodiment, compared to FIG. 6, the wireless communication module 192 may further include a first diplexer 710, a second diplexer 720, a third diplexer 730, and a fourth diplexer 740. An antenna module 197 may include a first antenna 751, a second antenna 752, a third antenna 753, and a fourth antenna 754. In an embodiment, the diplexers 710, 720, 730, and 740 may include a low-pass filter (LPF) or a high-pass filter (HPF). For example, the LPF may filter an input RF signal to output an RF signal having a low frequency band (e.g., a band including N77, for example, about 4.3 GHz or less). For example, the HPF may filter an input RF signal to output an RF signal having a high frequency band (e.g., 4.3 GHz or higher).

According to an embodiment, the first diplexer 710 may include a (1-1)th port 710*a* connected to the first antenna 751, a (1-2)th port 710*b* connected to a (3-1)th terminal 513*a* of the third switch 513, and a (1-3)th port 710*c* connected to a (1-1)th terminal 511*a* of the first switch 511. The low-pass filter may filter a signal received through one of the (1-1)th port 710*a* and the (1-2)th port 710*b* to output an RF signal having a low frequency band (e.g., N77) to the other port of the (1-1)th port 710*a* and the (1-2)th port 710*b*. The high-pass filter may filter a signal received through one of the (1-1)th port 710*a* and the (1-3)th port 710*c* to output an RF signal having a high frequency band (e.g., N79) to the other port of the (1-1)th port 710*a* and the (1-3)th port 710*c*.

According to an embodiment, the second diplexer 720 may include a (2-1)th port 720*a* connected to the second antenna 752, a (2-2)th port 720*b* connected to a (4-1)th terminal 514*a* of the fourth switch 514, and a (2-3)th port 720*c* connected to a (2-1)th terminal 512*a* of the second switch 512. The low-pass filter may filter a signal received through one of the (2-1)th port 720*a* and the (2-2)th port 720*b* to output an RF signal having a low frequency band to the other port of the (2-1)th port 720*a* and the (2-2)th port 720*b*. The high-pass filter may filter a signal received through one of the (2-1)th port 720*a* and the (2-3)th port 720*c* to output an RF signal having a high frequency band to the other port of the (2-1)th port 720*a* and the (2-3)th port 720*c*.

According to an embodiment, the third diplexer 730 may include a (3-1)th port 730*a* connected to the third antenna 753, a (3-2)th port 730*b* connected to a (4-2)th terminal 514*b* of the fourth switch 514, and a (3-3)th port 730*c* connected to a (2-2)th terminal 512*b* of the second switch 512. The low-pass filter may filter a signal received through one of the (3-1)th port 730*a* and the (3-2)th port 730*b* to output an RF signal having a low frequency band to the other port of the (3-1)th port 730*a* and the (3-2)th port 730*b*. The high-pass filter may filter a signal received through one of the (3-1)th port 730*a* and the (3-3)th port 730*c* to output an RF signal having a high frequency band to the other port of the (3-1)th port 730*a* and the (3-3)th port 730*c*.

According to an embodiment, the fourth diplexer 740 may include a (4-1)th port 740*a* connected to the fourth antenna 754, a (4-2)th port 740*b* connected to a (3-3)th terminal 513*c* of the third switch 513, and a (4-3)th port 740*c* connected to a (1-3)th terminal 511*c* of the first switch 511. The low-pass filter may filter a signal received through one of the (4-1)th port 740*a* and the (4-2)th port 740*b* to output an RF signal having a low frequency band to the other port of the (4-1)th port 740*a* and the (4-2)th port 740*b*. The high-pass filter may filter a signal received through one of the (4-1)th port 740*a* and the (4-3)th port 740*c* to output an RF signal having a high frequency band to the other port of the (4-1)th port 740*a* and the (4-3)th port 740*c*.

According to an embodiment, in a first transmission mode, a communication processor 192*a* may control the first switch 511 so that (1-1)th to (1-3)th terminals 511*a*, 511*b*, and 511*c* are sequentially connected to a (1-4)th terminal 511*d*, and may control the second switch 512 so that the (2-1)th terminal 512*a* or the (2-2)th terminal 512*b* is sequentially connected to a (2-6)th terminal 512*f* while the (1-2) terminal 511*b* of the first switch 511 is connected to the (1-4)th terminal 511*d*. According to the foregoing control operation, an RF signal (e.g., an SRS) in the first frequency band may be sequentially transmitted from the first to fourth antennas 751, 752, 753, and 754 to the wireless communication network.

According to an embodiment, in a second transmission mode, the communication processor 192*a* may control the first switch 511 so that a (1-6)th terminal 511*f* is connected to the (1-2)th terminal 511*b*, may control the second switch 512 so that the (2-6)th terminal 512*f* is connected to a (2-3)th terminal 512*c*, and may control the third switch 513 so that (3-1)th to (3-3)th terminals 513*a*, 513*b*, and 513*c* are sequentially connected to a (3-4)th terminal 513*d*. While the (3-4)th terminal 513*d* is connected to the (3-2)th terminal 513*b*, the (1-6)th terminal 511*f* is connected to the (1-2)th terminal 511*b*, and the (2-6)th terminal 512*f* is connected to the (2-3)th terminal 512*c*, the communication processor 192*a* may control the fourth switch 514 so that the (4-1)th terminal 514*a* or the (4-2)th terminal 514*b* is sequentially connected to a (4-5)th terminal 514*e*. According to the foregoing control operation, an RF signal (e.g., an SRS) in the second frequency band may be sequentially transmitted from the first to fourth antennas 751, 752, 753, and 754 to the wireless communication network.

Figure 8:
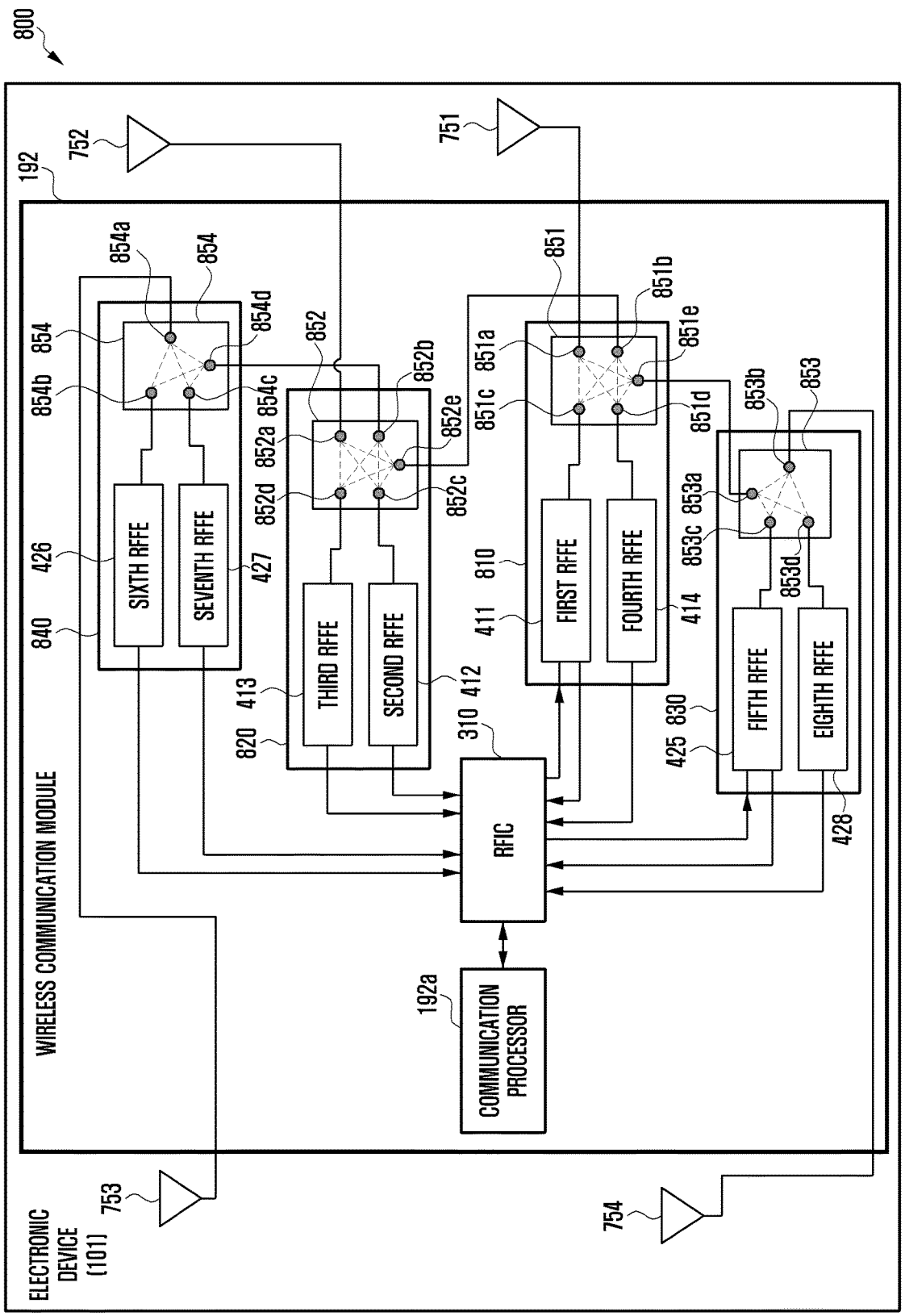
FIG. 8 is a block diagram of an example electronic device configured to transmit an RF signal in a first frequency band and an RF signal in a second frequency band to a wireless communication network according to various embodiments.

FIG. 8 is a block diagram 800 of an example electronic device 101 configured to transmit an RF signal in a first frequency band and an RF signal in a second frequency band to a wireless communication network according to various embodiments. Descriptions overlapping those of FIG. 7 are not repeated or briefly made. The diplexers 710, 720, 730, and 740 of FIG. 7 contribute to common use of the antennas, but may cause loss (e.g., insertion loss or line loss) of an RF signal due to being disposed near the antennas. Referring to FIG. 8, without the diplexers 710, 720, 730, and 740, an RF signal in the first frequency band or an RF signal of the second frequency band may be sequentially transmitted from antennas 751, 752, 753, and 754 to the wireless communication network. According to an embodiment, compared to FIG. 7, a wireless communication module 192 may include switches 851, 852, 853, and 854 other than the switches 511, 512, 513, and 514, without the diplexers 710, 720, 730, and 740. According to an embodiment, a first RFFE 411, a fourth RFFE 414, and a first switch 851 may be configured as a first front-end module 810. A second RFFE 412, a third RFFE 413, and a second switch 852 may be configured as a second front-end module 820. A fifth RFFE 425, an eighth RFFE 428, and a third switch 853 may be configured as a third front-end module 830. A sixth RFFE 426, a seventh RFFE 427, and a fourth switch 854 may be configured as a fourth front-end module 840.

According to an embodiment, the first switch 851 may include a (1-1)th terminal 851a connected to a first antenna 751, a (1-2)th terminal 851b connected to the second switch 852 through a conductive wiring line 860, a (1-3)th terminal 851c connected to the first RFFE 411, a (1-4)th terminal 851d connected to the fourth RFFE 414, and/or a (1-5)th terminal 851e connected to a third switch 853. According to an embodiment, in a first transmission mode, the (1-3)th terminal 851c may be sequentially connected to the (1-1)th terminal 851a, the (1-2)th terminal 851b, and the (1-5)th terminal 851e, based on a control signal received from a communication processor 192a. In a second transmission mode, the (1-5)th terminal 851e may be sequentially connected to the (1-1)th terminal 851a and the (1-2)th terminal 851b, based on a control signal received from the communication processor 192a.

According to an embodiment, the second switch 852 may include a (2-1)th terminal 852a connected to a second antenna 752, a (2-2)th terminal 852b connected to the fourth switch 854, a (2-3)th terminal 852c connected to the second RFFE 412, a (2-4)th terminal 852d connected to the third RFFE 413, and/or a (2-5)th terminal 852e connected to the (1-2)th terminal 851b of the first switch 851 through the conductive wiring line 860. According to an embodiment, in the first transmission mode and the second transmission mode, the (2-5)th terminal 852e may be sequentially connected to the (2-1)th terminal 852a and the (2-2)th terminal 852b, based on the control signal received from a communication processor 192a.

According to an embodiment, the third switch 853 may include a (3-1)th terminal 853a connected to the (1-5)th terminal 851e of the first switch 851, a (3-2)th terminal 853b connected to a fourth antenna 754, a (3-3)th terminal 853c connected to the fifth RFFE 425, and/or a (3-4)th terminal 853d connected to the eighth RFFE 428. According to an embodiment, in the first transmission mode, the (3-1)th terminal 853a may be connected to the (3-2)th terminal 853b, based on a control signal received from the communication processor 192a. According to an embodiment, in the second transmission mode, the (3-3)th terminal 853c may be sequentially connected to the (3-1)th terminal 853a and the (3-2)th terminal 853b, based on a control signal received from the communication processor 192a.

According to an embodiment, the fourth switch 854 may include a (4-1)th terminal 854a connected to a third antenna 753, a (4-2)th terminal 854b connected to the sixth RFFE 426, a (4-3)th terminal 854c connected to the seventh RFFE 427, and/or a (4-4)th terminal 854d connected to the (2-2)th terminal 852b of the second switch 852. According to an embodiment, in the first transmission mode and the second transmission mode, the (4-1)th terminal 854a may be connected to the (4-4)th terminal 854d, based on a control signal received from the communication processor 192a.

According to an embodiment, in the first transmission mode, the communication processor 192a may control the first switch 851 so that the (1-3)th terminal 851c is sequentially connected to the (1-1)th terminal 851a, the (1-2)th terminal 851b, and the (1-5)th terminal 851e. While the (1-3)th terminal 851c is connected to the (1-2)th terminal 851b, the communication processor 192a may control the second switch 852 so that the (2-5)th terminal 852e are sequentially connected to the (2-1)th terminal 852a and the (2-2)th terminal 852b. While the (1-3)th terminal 851c is connected to the (1-2)th terminal 851b and the (2-5)th terminal 852e is connected to the (2-2)th terminal 852b, the communication processor 192a may control the fourth switch 854 so that the (4-1)th terminal 854a is connected to the (4-4)th terminal 854d. While the (1-3)th terminal 851c is connected to the (1-5)th terminal 851e, the communication processor 192a may control the third switch 853 so that the (3-1)th terminal 853a is connected to the (3-2)th terminal 853b. According to the foregoing control operation, an RF signal (e.g., an SRS) in the first frequency band may be sequentially transmitted from the first to fourth antennas 751, 752, 753, and 754 to the wireless communication network.

According to an embodiment, in the second transmission mode, the communication processor 192a may control the third switch 853 so that the (3-3)th terminal 853c is sequentially connected to the (3-1)th terminal 853a and the (3-2)th terminal 853b. While the (3-3)th terminal 853c is connected to the (3-1)th terminal 853a, the communication processor 192a may control the first switch 851 so that the (1-5)th terminal 851e is sequentially connected to the (1-1)th terminal 851a and the (1-2)th terminal 851b. While the (3-3)th terminal 853c is connected to the (3-1)th terminal 853a and the (1-5)th terminal 851e is connected to the (1-2)th terminal 851b, the communication processor 192a may control the second switch 852 so that the (2-5)th terminal 852e is sequentially connected to the (2-1)th terminal 852a and the (2-2)th terminal 852b. While the (3-3)th terminal 853c is connected to the (3-1)th terminal 853a, the (1-5)th terminal 851e is connected to the (1-2)th terminal 851b, and the (2-5)th terminal 852e is connected to the (2-2)th terminal 852b, the communication processor 192a may control the fourth switch 854 so that the (4-1)th terminal 854a is connected to the (4-4)th terminal 854d. According to the foregoing control operation, an RF signal (e.g., an SRS) in the second frequency band may be sequentially transmitted from the first to fourth antennas 751, 752, 753, and 754 to the wireless communication network.

Figure 9:
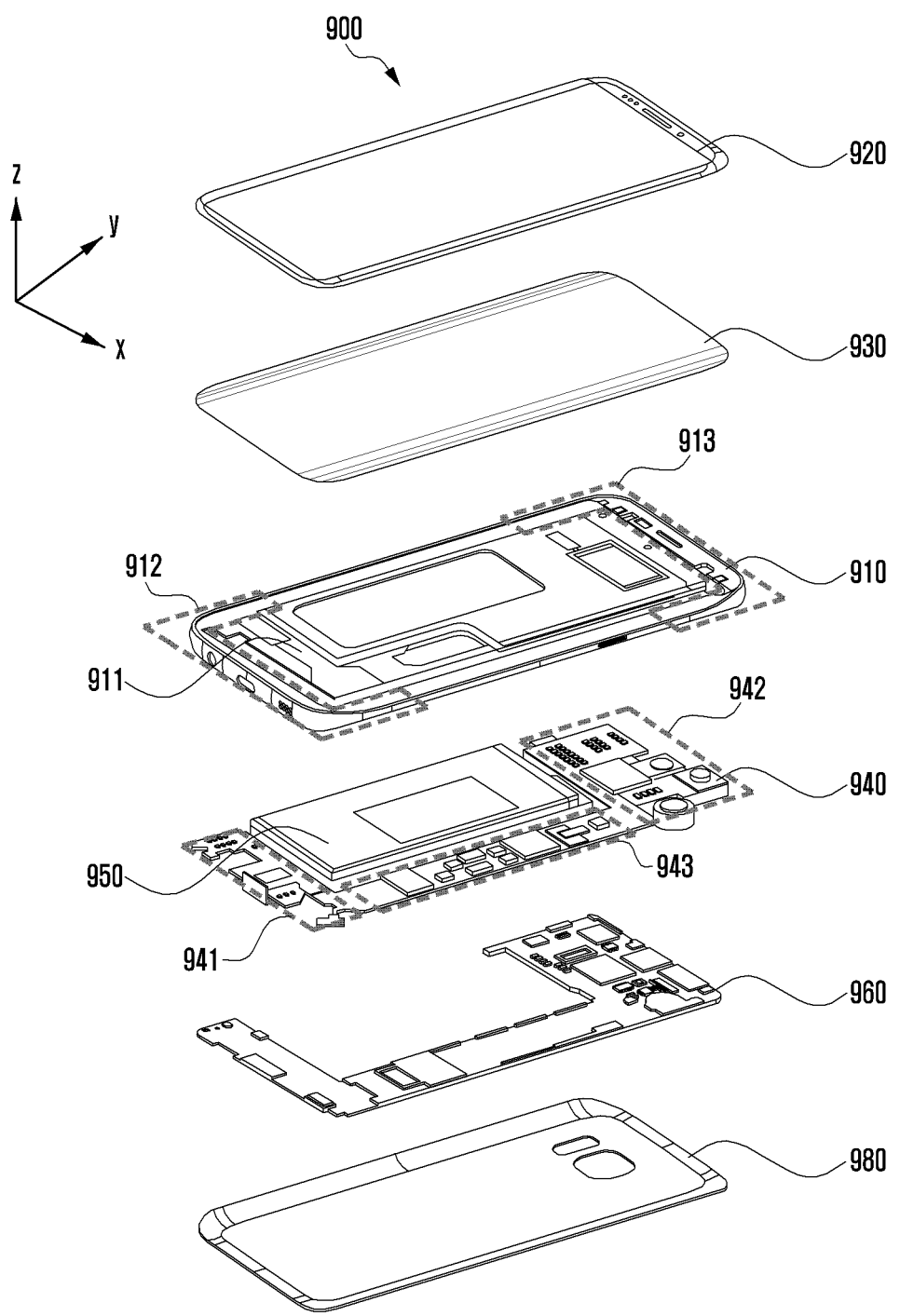
FIG. 9 is an exploded perspective view of an example electronic device according to various embodiments.

FIG. 9 is an exploded perspective view of an example electronic device 900 according to various embodiments. Referring to FIG. 9, the electronic device 900 (e.g., the electronic device 101 of FIG. 1) may include a lateral bezel structure 910, a first support member 911 (e.g., a bracket), a front plate (or first cover) 920, a display 930, a printed circuit board 940, a battery 950, a second support member 960 (e.g., a rear case), and a rear plate (or second cover) 980. The front plate 920 may form a first side (or front side) of the electronic device 900 facing in a first direction, the rear plate 980 may form a second side (or rear side) of the electronic device 900 facing in a second direction opposite to the first direction, and the lateral bezel structure 910 may form a lateral side surface surrounding a space between the first side and the second side. According to an embodiment, a structure including the first side, the second side, and the lateral side may be referred to as a housing structure. In an embodiment, the electronic device 900 may omit at least one (e.g., the first support member 911 or the second support member 960) of the components, or may additionally include another component The first support member 911 may be disposed inside the electronic device 900, and may be connected to the lateral bezel structure 910 or may be integrally formed with the lateral bezel structure 910. The first support member 911 may be formed of, for example, a metallic material and/or a nonmetallic (e.g., polymer) material. One side of the first support member 911 may be coupled with the display 930, and another side thereof may be coupled with the printed circuit board 940. The display 930 may be exposed through the front side. A processor (e.g., the processor 120 of FIG. 1), a wireless communication module (e.g., the wireless communication module 192 of FIG. 1), a memory, and/or an interface may be mounted on the printed circuit board 940. The memory may include, for example, a volatile memory or a nonvolatile memory. The interface may include, for example, a high definition multimedia interface (HDMI), a universal serial bus (USB) interface, an SD card interface, and/or an audio interface. The interface may, for example, electrically or physically, connect the electronic device 900 to an external electronic device, and may include a USB connector, an SD card/MMC connector, or an audio connector.

The battery 950 is a device for supplying power to at least one component of the electronic device 900, and may include, for example, a non-rechargeable primary cell, a rechargeable secondary cell, or a fuel cell. At least part of the battery 950 may be disposed substantially on the same plane as the printed circuit board 940, for example. The battery 950 may be integrally disposed inside the electronic device 900, or may be disposed detachably from the electronic device 900.

According to an embodiment, the printed circuit board 940 has a first area (or lower area) 941, a second area (or upper area) 942, and/or a third area (or, intermediate area) 943. The third area 943 may extend in one direction (e.g., a y-axis direction) from the first area 941. The second area 942 may extend from the third area 943. According to various embodiments of the disclosure, the wireless communication module 192, for example, RFFEs and switches, may be disposed partially in the first area 941 and the second area 942.

Referring to FIG. 3, in an embodiment, the first RFFE 321, the fourth RFFE 324, and the first switch 331 may be disposed in the first area 941. The first antenna 341 and the fourth antenna 344 may be disposed closer to the first RFFE 321 and the fourth RFFE 324 than to the second RFFE 322 and the third RFFE 323. For example, the first antenna 341 and the fourth antenna 344 may be disposed in the first area 941, wherein the first antenna 341 may be disposed adjacent to the first RFFE 321, and the fourth antenna 344 may be disposed adjacent to the fourth RFFE 324. In another example, at least a portion of a first lateral area 912 adjacent to the first area 941 in the side bezel structure 910 may include a conductor (hereinafter, a first conductor). For example, the first conductor may be used as an emitter (e.g., at least a portion of the first antenna 341 and/or at least a portion of the fourth antenna 344). In an embodiment, the second RFFE 322, the third RFFE 323, and the second switch 332 may be disposed in the second area 942. The second antenna 342 and the third antenna 343 may be disposed closer to the second RFFE 322 and the third RFFE 323 than to the first RFFE 321 and the fourth RFFE 324. For example, the second antenna 342 and the third antenna 343 may be disposed in the second area 942, wherein the second antenna 342 may be disposed adjacent to the second RFFE 322, and the third antenna 343 may be disposed adjacent to the third RFFE 323. In another example, at least a portion of a second lateral area 913 adjacent to the third area 943 in the side bezel structure 910 may include a conductor (hereinafter, a second conductor). For example, the second conductor may be used as an emitter (e.g., at least a portion of the second antenna 342 and/or at least a portion of the third antenna 343).

According to an embodiment, the conductive wiring line 333 may electrically connect the first switch 331 and the second switch 332. For example, at least a portion of the conductive wiring line 333 may be disposed in the third area 943, and may electrically connect the switches 331 and 332. Accordingly, an RF transmission circuit (e.g., the first RFFE 321) disposed in the first area 941 may be connected to not only the nearby antennas 341 and 344 but also the antennas 342 and 343 disposed relatively distant through the single conductive wiring line 333, and may transmit an SRS to the wireless communication network using the antennas 342 and 343. As the number of conductive wiring lines is reduced, a mounting area for conductive wiring lines may be reduced, power loss (e.g., IL) of the SRS may be reduced, and data throughput of the SRS may be increased.

Referring to FIG. 4, in an embodiment, the first RFFE 411, the fourth RFFE 414, the fifth RFFE 425, the eighth RFFE 428, the first switch 431, and/or the third switch 441 may be disposed in the first area 941. The antennas 451, 454, 455, and 458 may be disposed, for example, in the first area 941. For example, the first conductor may be used as at least a portion of the antennas 451, 454, 455, and 458. In an embodiment, the second RFFE 412, the third RFFE 413, the sixth RFFE 426, the seventh RFFE 427, the second switch 432, and/or the fourth switch 442 may be disposed in the second area 942. The antennas 452, 453, 456, and 457 may be disposed, for example, in the second area 942. For example, the second conductor may be used as at least a portion of the antennas 452, 453, 456, and 457. In an embodiment, at least a portion of the first conductive wiring line 433 may be disposed in the third area 943 to electrically connect the switches 431 and 432, and thus the first RFFE 411 disposed in the first area 941 may transmit an SRS in the first frequency band (e.g., one of N77 or N79) to the wireless communication network through not only the nearby antennas 451 and 454 but also the antennas 452 and 453 disposed relatively distant. In another example, due to the second conductive wiring line 443, the fifth RFFE 425 may also transmit an SRS in the second frequency band (e.g., another of N77 or N79) to the wireless communication network through not only the nearby antennas 455 and 458 but also the antennas 456 and 457 disposed relatively distant.

Referring to FIG. 5, in an embodiment, the first RFFE 411, the fourth RFFE 414, the fifth RFFE 425, the eighth RFFE 428, the first switch 511, and/or the third switch 513 may be disposed in the first area 941. In an embodiment, the second RFFE 412, the third RFFE 413, the sixth RFFE 426, the seventh RFFE 427, the second switch 512, and/or the fourth switch 514 may be disposed in the second area 942. At least a portion of the conductive wiring line 515 may be disposed in the third area 943. The first RFFE 411 may be connected to antennas disposed in the first area 941 and the second area 942 through the conductive wiring line 515.

Referring to FIG. 6 and FIG. 7, the first front-end module 610 and the third front-end module 630 may be disposed in the first area 941, and the second front-end module 620 and the fourth front-end module 640 may be disposed in the second area 942. The first front-end module 610 and the second front-end module 620 may be electrically connected by the conductive wiring line 515.

Referring to FIG. 8, the first front-end module 810 and the third front-end module 830 may be disposed in the first area 941, and the second front-end module 820 and the fourth front-end module 840 may be disposed in the second area 942. At least a portion of the conductive wiring line 860 may be disposed in the third area 943.

According to an embodiment, the positions of the first area 941 and the second area 942 may be changed.

According to an embodiment, the foregoing conductive wiring lines may include a wiring line formed on the printed circuit board 940, a coaxial cable, and/or an RF transmission line using a flexible PCB (FPCB) (e.g., a flexible RF cable (FRC)).

A portable electronic device (e.g., the electronic device 101 of FIG. 3) according to various embodiments may include: a first antenna, a second antenna, and a third antenna; a first RFFE, a second RFFE, and a third RFFE which are configured to preprocess an RF signal; a first conductive wiring line; a first switch (e.g., the first switch 331) including a (1-1)th terminal connected to the first antenna, a (1-2)th terminal connected to one end of the first conductive wiring line, and a (1-3)th terminal connected to the first RFFE; a second switch (e.g., the second switch 332) including a (2-1)th terminal connected to the second antenna, a (2-2)th terminal connected to the third antenna, a (2-3)th terminal connected to the second RFFE, a (2-4)th terminal connected to the third RFFE, and a (2-5)th terminal connected to another end of the first conductive wiring line; an RFIC (e.g., the RFIC 310) configured to convert an RF signal input from the first RFFE, the second RFFE, and the third RFFE into a baseband signal, and convert a baseband signal into an RF signal to output the RF signal to the first RFFE; and a communication processor (e.g., the communication processor 192*a*) configured to control the first switch to sequentially connect the (1-3)th terminal to the (1-1)th terminal and the (1-2)th terminal, and control the second switch to sequentially connect the (2-1)th terminal and the (2-2)th terminal to the (2-5)th terminal while the (1-2)th terminal is connected to the (1-3)th terminal, when the portable electronic device operates in a first transmission mode for transmitting a sounding reference signal (SRS) to a wireless communication network using the first RFFE.

The portable electronic device may further include a fourth antenna (e.g., the fourth antenna 344) and a fourth RFFE (e.g., the fourth RFFE 324), the RFIC may convert an RF signal input from the fourth RFFE into a baseband signal, and the first switch may further include a (1-4)th terminal connected to the fourth antenna and a (1-5)th terminal connected to the fourth RFFE. The communication processor may be configured to control the first switch to sequentially connect the (1-3)th terminal to the (1-1)th terminal, the (1-2)th terminal, and the (1-4)th terminal, and control the second switch to sequentially connect the (2-1)th terminal and the (2-2)th terminal to the (2-5)th terminal while the (1-2)th terminal is connected to the (1-3)th terminal, when the portable electronic device operates in the first transmission mode.

The first RFFE, the second RFFE, the third RFFE, and the fourth RFFE may be configured to preprocess an RF signal in a first frequency band. The RFIC may be configured to convert the baseband signal into the RF signal in the first frequency band to output the RF signal to the first RFFE. The first frequency band may be one of 5G sub-6 bands.

The portable electronic device (e.g., the electronic device 101 of FIG. 4) may further include: a fifth antenna, a sixth antenna, a seventh antenna, and an eighth antenna; a fifth RFFE, a sixth RFFE, a seventh RFFE, and an eighth RFFE configured to preprocess an RF signal in a second frequency band which is another frequency band of the 5G sub-6 bands; a second conductive wiring line; a third switch including a (3-1)th terminal connected to the fifth antenna, a (3-2)th terminal connected to one end of the second conductive wiring line, a (3-3)th terminal connected to the eighth antenna, a (3-4)th terminal connected to the fifth RFFE, and a (3-5)th terminal connected to the eighth RFFE; and a fourth switch including a (4-1)th terminal connected to the sixth antenna, a (4-2)th terminal connected to the seventh antenna, a (4-3)th terminal connected to the sixth RFFE, a (4-4)th terminal connected to the seventh RFFE, and a (4-5)th terminal connected to another end of the second conductive wiring line. The communication processor may be configured to control the third switch to sequentially connect the (3-4)th terminal to the (3-1)th terminal, the (3-2)th terminal, and the (3-3)th terminal, and control the fourth switch to sequentially connect the (4-1)th terminal and the (4-2)th terminal to the (4-5)th terminal while the (3-2)th terminal is connected to the (3-4)th terminal, when the portable electronic device operates in a second transmission mode for transmitting an SRS to the wireless communication network using the fifth RFFE. The first frequency band may be one of N77 and N79, and the second frequency band may be another of N77 and N79.

The portable electronic device may further include a printed circuit board disposed in an internal space of the portable electronic device. The printed circuit board may include a first area and a second area. The first RFFE, the fourth RFFE, the first switch, the first antenna, and the fourth antenna may be disposed in the first area. The second RFFE, the third RFFE, the second switch, the second antenna, and the third antenna may be disposed in the second area. The printed circuit board may further include a third area extending from the first area to the second area. At least a portion of the first conductive wiring line may be disposed in the third area. The first conductive wiring line may include at least one of a coaxial cable, a flexible RF cable (FRC), or a wiring line formed in the third area.

A portable electronic device (e.g., the portable electronic device 101 of FIG. 5) according to various embodiments may include: a first antenna, a second antenna, a third antenna, a fourth antenna, a fifth antenna, a sixth antenna, a seventh antenna, and an eighth antenna; a first RFFE, a second RFFE, a third RFFE, and a fourth RFFE configured to preprocess an RF signal in a first frequency band; a fifth RFFE, a sixth RFFE, a seventh RFFE, and an eighth RFFE configured to preprocess an RF signal in a second frequency band; a conductive wiring line; a first switch, a second switch, a third switch, and a fourth switch; an RFIC configured to convert the RF signal in the first frequency band input from the first RFFE, the second RFFE, the third RFFE, and the fourth RFFE into a baseband signal, convert a baseband signal into an RF signal in the first frequency band to output the RF signal to the first RFFE, convert the RF signal in the second frequency band input from the fifth RFFE, the sixth RFFE, the seventh RFFE, and the eighth RFFE into a baseband signal, and convert a baseband signal into an RF signal in the second frequency band to output the RF signal to the fifth RFFE; and a communication processor configured to control the first switch, the second switch, the third switch, and the fourth switch. The first switch may include a (1-1)th terminal 511*a* connected to the first antenna, a (1-2)th terminal 511*b* connected to one end of the conductive wiring line, a (1-3)th terminal 511*c* connected to the fourth antenna, a (1-4)th terminal 511*d* connected to the first RFFE, a (1-5)th terminal 511*e* connected to the fourth RFFE, and a (1-6)th terminal 511*f* connected to the third switch. The second switch may include a (2-1)th terminal 512*a* connected to the second antenna, a (2-2)th terminal 512*b* connected to the third antenna, a (2-3)th terminal 512*c* connected to the fourth switch, a (2-4)th terminal 512*d* connected to the second RFFE, a (2-5)th terminal 512*e* connected to the third RFFE, and a (2-6)th terminal 512*f* connected to another end of the conductive wiring line. The third switch may include a (3-1)th terminal 513a connected to the fifth antenna, a (3-2)th terminal 513b connected to the (1-6)th terminal 511f, a (3-3)th terminal 513c connected to the eighth antenna, a (3-4)th terminal 513d connected to the fifth RFFE, and a (3-5)th terminal 513e connected to the eighth RFFE. The fourth switch may include a (4-1)th terminal 514a connected to the sixth antenna, a (4-2)th terminal 514b connected to the seventh antenna, a (4-3)th terminal 514c connected to the sixth RFFE, a (4-4)th terminal 514d connected to the seventh RFFE, and a (4-5)th terminal 514e connected to the (2-3)th terminal 512c. The communication processor may be configured to control the first switch to sequentially connect the (1-1)th terminal, the (1-2)th terminal, and the (1-3)th terminal 511a, 511b, and 511c to the (1-4)th terminal 511d, and control the second switch to sequentially connect the (2-1)th terminal and (2-2)th terminal 512a and 512b to the (2-6)th terminal 512f while the (1-2)th terminal 511b is connected to the (1-4)th terminal 511d, when the portable electronic device operates in a first transmission mode for transmitting an SRS to a wireless communication network using the first RFFE. The communication processor may be configured to control the first switch to connect the (1-6)th terminal 511f to the (1-2)th terminal 511b, control the second switch to connect the (2-6)th terminal 512f to the (2-3)th terminal 512c, control the third switch to sequentially connect the (3-1)th terminal, the (3-2)th terminal, and the (3-3)th terminal 513a, 513b, and 513c to the (3-4)th terminal 513d, and control the fourth switch to sequentially connect the (4-1)th terminal and the (4-2)th terminal 514a and 514b to the (4-5)th terminal 514e while the (3-4)th terminal 513d is connected to the (3-2)th terminal 513b, the (1-6)th terminal 511f is connected to the (1-2)th terminal 511b, and the (2-6)th terminal 512f is connected to the (2-3)th terminal 512c, when the portable electronic device operates in a second transmission mode for transmitting an SRS to the wireless communication network using the fifth RFFE.

The first frequency band may be one of N77 and N79, and the second frequency band may be another of N77 and N79.

The portable electronic device may further include a printed circuit board disposed in an internal space of the portable electronic device, and including a first area and a second area. The first RFFE, the fourth RFFE, the fifth RFFE, the eighth RFFE, the first switch, the third switch, the first antenna, the fourth antenna, the fifth antenna, and the eighth antenna may be disposed in the first area. The second RFFE, the third RFFE, the sixth RFFE, the seventh RFFE, the second switch, the fourth switch, the second antenna, the third antenna, the sixth antenna, and the seventh antenna may be disposed in the second area.

The first RFFE, the fourth RFFE, and the first switch may be integrated into one module (e.g., the first front-end module 610 of FIG. 6). The second RFFE, the third RFFE, and the second switch may be integrated into one module (e.g., the second front-end module 620 of FIG. 6). The fifth RFFE, the eighth RFFE, and the third switch may be integrated into one module (e.g., the third front-end module 630 of FIG. 6). The sixth RFFE, the seventh RFFE, and the fourth switch may be integrated into one module (e.g., the fourth front-end module 640 of FIG. 6).

A portable electronic device (e.g., the electronic device 101 of FIG. 7) according to various embodiments may include: a first antenna, a second antenna, a third antenna, and a fourth antenna; a first RFFE, a second RFFE, a third RFFE, and a fourth RFFE configured to preprocess an RF signal in a first frequency band; a fifth RFFE, a sixth RFFE, a seventh RFFE, and an eighth RFFE configured to preprocess an RF signal in a second frequency band which is lower than the first frequency band; a conductive wiring line; a first diplexer, a second diplexer, a third diplexer, and a fourth diplexer configured to commonly include an HPF which filters out the RF signal in the second frequency band and allows the RF signal in the first frequency band to pass and an LPF which filters out the RF signal in the first frequency band and allows the RF signal in the second frequency band to pass; a first switch, a second switch, a third switch, and a fourth switch; an RFIC configured to convert the RF signal in the first frequency band input from the first RFFE, the second RFFE, the third RFFE, and the fourth RFFE into a baseband signal, convert a baseband signal into an RF signal in the first frequency band to output the RF signal to the first RFFE, convert the RF signal in the second frequency band input from the fifth RFFE, the sixth RFFE, the seventh RFFE, and the eighth RFFE into a baseband signal, and convert a baseband signal into an RF signal in the second frequency band to output the RF signal to the fifth RFFE; and a communication processor configured to control the first switch, the second switch, the third switch, and the fourth switch. The first diplexer may include a (1-1)th port 710a disposed between the LPF and the HPF of the first diplexer and connected to the first antenna, a (1-2)th port 710b connected to the third switch, and a (1-3)th port 710c connected to the first switch, the LPF of the first diplexer may be positioned between the (1-1)th port 710a and the (1-2)th port 710b, and the HPF of the first diplexer may be positioned between the (1-1)th port 710a and the (1-3)th port 710c. The second diplexer may include a (2-1)th port 720a disposed between the LPF and the HPF of the second diplexer and connected to the second antenna, a (2-2)th port 720b connected to the fourth switch, and a (2-3)th port 720c connected to the second switch, the LPF of the second diplexer may be positioned between the (2-1)th port 720a and the (2-2)th port 720b, and the HPF of the second diplexer may be positioned between the (2-1)th port 720a and the (2-3)th port 720c. The third diplexer may include a (3-1)th port 730a disposed between the LPF and the HPF of the third diplexer and connected to the third antenna, a (3-2)th port 730b connected to the fourth switch, and a (3-3)th port 730c connected to the second switch, the LPF of the third diplexer may be positioned between the (3-1)th port 730a and the (3-2)th port 730b, and the HPF of the third diplexer may be positioned between the (3-1)th port 730a and the (3-3)th port 730c. The fourth diplexer may include a (4-1)th port 740a disposed between the LPF and the HPF of the fourth diplexer and connected to the fourth antenna, a (4-2)th port 740b connected to the third switch, and a (4-3)th port 740c connected to the first switch, the LPF of the fourth diplexer may be positioned between the (4-1)th port 740a and the (4-2)th port 740b, and the HPF of the fourth diplexer may be positioned between the (4-1)th port 740a and the (4-3)th port 740c. The first switch may include a (1-1)th terminal 511a connected to the (1-3)th port 710c, a (1-2)th terminal 511b connected to one end of the conductive wiring line 515, a (1-3)th terminal 511c connected to the (4-3)th port 740c, a (1-4)th terminal 511d connected to the first RFFE, a (1-5)th terminal 511e connected to the fourth RFFE, and a (1-6)th terminal 511f connected to the third switch. The second switch may include a (2-1)th terminal 512a connected to the (2-3)th port 720c, a (2-2)th terminal 512b connected to the (3-3)th port 730c, a (2-3)th terminal 512c connected to the fourth switch, a (2-4)th terminal 512d connected to the second RFFE, a (2-5)th terminal 512e connected to the third RFFE, and a (2-6)th terminal 512f connected to another end of the conductive wiring line. The third switch may include a (3-1)th terminal 513*a* connected to the (1-2)th port 710*b*, a (3-2)th terminal 513*b* connected to the (1-6)th terminal 511*f*, a (3-3)th terminal 513*c* connected to the (4-2)th port 740*b*, a (3-4)th terminal 513*d* connected to the fifth RFFE, and a (3-5)th terminal 513*e* connected to the eighth RFFE. The fourth switch may include a (4-1)th terminal 514*a* connected to the (2-2)th port 720*b*, a (4-2)th terminal 514*b* connected to the (3-2)th port 730*b*, a (4-3)th terminal 514*c* connected to the sixth RFFE, a (4-4)th terminal 514*d* connected to the seventh RFFE, and a (4-5)th terminal 514*e* connected to the (2-3)th terminal 512*c*. The communication processor may be configured to control the first switch to sequentially connect the (1-1)th terminal, the (1-2)th terminal, and the (1-3)th terminal 511*a*, 511*b*, and 511*c* to the (1-4)th terminal 511*d*, and control the second switch to sequentially connect the (2-1)th terminal and (2-2)th terminal 512*a* and 512*b* to the (2-6)th terminal 512*f* while the (1-2)th terminal 511*b* is connected to the (1-4)th terminal 511*d*, when the portable electronic device operates in a first transmission mode for transmitting an SRS to a wireless communication network using the first RFFE. The communication processor may be configured to control the first switch to connect the (1-6)th terminal 511*f* to the (1-2)th terminal 511*b*, control the second switch to connect the (2-6)th terminal 512*f* to the (2-3)th terminal 512*c*, control the third switch to sequentially connect the (3-1)th terminal, the (3-2)th terminal, and the (3-3)th terminal 513*a*, 513*b*, and 513*c* to the (3-4)th terminal 513*d*, and control the fourth switch to sequentially connect the (4-1)th terminal and the (4-2)th terminal 514*a* and 514*b* to the (4-5)th terminal 514*e* while the (3-4)th terminal 513*d* is connected to the (3-2)th terminal 513*b*, the (1-6)th terminal 511*f* is connected to the (1-2)th terminal 511*b*, and the (2-6)th terminal 512*f* is connected to the (2-3)th terminal 512*c*, when the portable electronic device operates in a second transmission mode for transmitting an SRS to the wireless communication network using the fifth RFFE.

A portable electronic device (e.g., the electronic device 101 of FIG. 8) according to various embodiments may include: a first antenna, a second antenna, a third antenna, and a fourth antenna; a first RFFE, a second RFFE, a third RFFE, and a fourth RFFE configured to preprocess an RF signal in a first frequency band; a fifth RFFE, a sixth RFFE, a seventh RFFE, and an eighth RFFE configured to preprocess an RF signal in a second frequency band which is different from the first frequency band; a conductive wiring line; a first switch, a second switch, a third switch, and a fourth switch; an RFIC configured to convert the RF signal in the first frequency band input from the first RFFE, the second RFFE, the third RFFE, and the fourth RFFE into a baseband signal, convert a baseband signal into an RF signal in the first frequency band to output the RF signal to the first RFFE, convert the RF signal in the second frequency band input from the fifth RFFE, the sixth RFFE, the seventh RFFE, and the eighth RFFE into a baseband signal, and convert a baseband signal into an RF signal in the second frequency band to output the RF signal to the fifth RFFE; and a communication processor configured to control the first switch, the second switch, the third switch, and the fourth switch. The first switch may include a (1-1)th terminal 851*a* connected to the first antenna, a (1-2)th terminal 851*b* connected to the second switch through the conductive wiring line, a (1-3)th terminal 851*c* connected to the first RFFE, a (1-4)th terminal 851*d* connected to the fourth RFFE, and a (1-5)th terminal 851*e* connected to a third switch. The second switch may include a (2-1)th terminal 852*a* connected to the second antenna, a (2-2)th terminal 852*b* connected to the fourth switch, a (2-3)th terminal 852*c* connected to the second RFFE, a (2-4)th terminal 852*d* connected to the third RFFE, and a (2-5)th terminal 852*e* connected to the (1-2)th terminal 851*b* through the conductive wiring line. The third switch may include a (3-1)th terminal 853*a* connected to the (1-5)th terminal 851*e*, a (3-2)th terminal 853*b* connected to the fourth antenna, a (3-3)th terminal 853*c* connected to the fifth RFFE, and a (3-4)th terminal 853*d* connected to the eighth RFFE. The fourth switch may include a (4-1)th terminal 854*a* connected to the third antenna, a (4-2)th terminal 854*b* connected to the sixth RFFE, a (4-3)th terminal 854*c* connected to the seventh RFFE, and a (4-4)th terminal 854*d* connected to the (2-2)th terminal 852*b*. The communication processor may be configured to control the first switch to sequentially connect the (1-3)th terminal 851*c* to the (1-1)th terminal 851*a*, the (1-2)th terminal 851*b*, and the (1-5)th terminal 851*e*, control the second switch to sequentially connect the (2-5)th terminal 852*e* to the (2-1)th terminal 852*a* and the (2-2)th terminal 852*b* while the (1-3)th terminal 851*c* is connected to the (1-2)th terminal 851*b*, control the fourth switch to connect the (4-1)th terminal 854*a* to the (4-4)th terminal 854*d* while the (2-5)th terminal 852*e* is connected to the (2-2)th terminal 852*b*, and control the third switch to connect the (3-1)th terminal 853*a* to the (3-2)th terminal 853*b* while the (1-3)th terminal 851*c* is connected to the (1-5)th terminal 851*e*, when the portable electronic device operates in a first transmission mode for transmitting an SRS to a wireless communication network using the first RFFE. The communication processor may be configured to control the third switch to sequentially connect the (3-3)th terminal 853*c* to the (3-1)th terminal 853*a* and the (3-2)th terminal 853*b*, control the first switch to sequentially connect the (1-5)th terminal 851*e* to the (1-1)th terminal 851*a* and the (1-2)th terminal 851*b* while the (3-3)th terminal 853*c* is connected to the (3-1)th terminal 853*a*, control the second switch to sequentially connect the (2-5)th terminal 852*e* to the (2-1)th terminal 852*a* and the (2-2)th terminal 852*b* while the (1-5)th terminal 851*e* is connected to the (1-2)th terminal 851*b*, and control the fourth switch to connect the (4-1)th terminal 854*a* to the (4-4)th terminal 854*d* while the (2-5)th terminal 852*e* is connected to the (2-2)th terminal 852*b*, when the portable electronic device operates in a second transmission mode for transmitting an SRS to the wireless communication network using the fifth RFFE.

Embodiments disclosed in the specification and drawings are merely to provide specific examples in order to easily describe technical content according to the embodiments of the disclosure and to assist understanding of the embodiments of the disclosure and are not intended to limit the scope of the embodiments of the disclosure. Therefore, the scope of various embodiments of the disclosure should be interpreted to include all changes or modifications derived based on the technical idea of various embodiments of the disclosure in addition to the embodiments disclosed herein.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A portable electronic device comprising:
   a first antenna, a second antenna, and a third antenna;
   a first radio frequency front end (RFFE), a second RFFE, and a third RFFE which are configured to preprocess a radio frequency (RF) signal;
   a first conductive wiring line;
   a first switch comprising a (1-1)th terminal connected to the first antenna, a (1-2)th terminal connected to one end of the first conductive wiring line, and a (1-3)th terminal connected to the first RFFE;
   a second switch comprising a (2-1)th terminal connected to the second antenna, a (2-2)th terminal connected to the third antenna, a (2-3)th terminal connected to the second RFFE, a (2-4)th terminal connected to the third RFFE, and a (2-5)th terminal connected to another end of the first conductive wiring line;
   a radio frequency integrated circuit (RFIC) configured to convert an RF signal input from the first RFFE, the second RFFE, and the third RFFE into a baseband signal, and convert a baseband signal into an RF signal to output the RF signal to the first RFFE; and
   a communication processor configured to control the first switch to sequentially connect the (1-3)th terminal to the (1-1)th terminal and the (1-2)th terminal, and control the second switch to sequentially connect the (2-1)th terminal and the (2-2)th terminal to the (2-5)th terminal while the (1-2)th terminal is connected to the (1-3)th terminal, when the portable electronic device operates in a first transmission mode for transmitting a sounding reference signal (SRS) to a wireless communication network using the first RFFE.

2. The portable electronic device of claim 1, further comprising a fourth antenna and a fourth RFFE, the RFIC being configured to convert an RF signal input from the fourth RFFE into a baseband signal, and the first switch further comprising a (1-4)th terminal connected to the fourth antenna and a (1-5)th terminal connected to the fourth RFFE, wherein the communication processor is configured to control the first switch to sequentially connect the (1-3)th terminal to the (1-1)th terminal, the (1-2)th terminal, and the (1-4)th terminal, and control the second switch to sequentially connect the (2-1)th terminal and the (2-2)th terminal to the (2-5)th terminal while the (1-2)th terminal is connected to the (1-3)th terminal, when the portable electronic device operates in the first transmission mode.

3. The portable electronic device of claim 2, wherein the first RFFE, the second RFFE, the third RFFE, and the fourth RFFE are configured to preprocess an RF signal in a first frequency band, and
   wherein the RFIC is configured to convert the baseband signal into the RF signal in the first frequency band to output the RF signal to the first RFFE.

4. The portable electronic device of claim 3, wherein the first frequency band is one of 5G sub-6 bands.

5. The portable electronic device of claim 4, further comprising:
   a fifth antenna, a sixth antenna, a seventh antenna, and an eighth antenna;
   a fifth RFFE, a sixth RFFE, a seventh RFFE, and an eighth RFFE configured to preprocess an RF signal in a second frequency band which is another frequency band of the 5G sub-6 bands;
   a second conductive wiring line;
   a third switch comprising a (3-1)th terminal connected to the fifth antenna, a (3-2)th terminal connected to one end of the second conductive wiring line, a (3-3)th terminal connected to the eighth antenna, a (3-4)th terminal connected to the fifth RFFE, and a (3-5)th terminal connected to the eighth RFFE; and
   a fourth switch comprising a (4-1)th terminal connected to the sixth antenna, a (4-2)th terminal connected to the seventh antenna, a (4-3)th terminal connected to the sixth RFFE, a (4-4)th terminal connected to the seventh RFFE, and a (4-5)th terminal connected to another end of the second conductive wiring line,
   wherein the communication processor is configured to control the third switch to sequentially connect the (3-4)th terminal to the (3-1)th terminal, the (3-2)th terminal, and the (3-3)th terminal, and control the fourth switch to sequentially connect the (4-1)th terminal and the (4-2)th terminal to the (4-5)th terminal while the (3-2)th terminal is connected to the (3-4)th terminal, when the portable electronic device operates in a second transmission mode for transmitting an SRS to the wireless communication network using the fifth RFFE.

6. The portable electronic device of claim 5, wherein the first frequency band is one of N77 and N79, and the second frequency band is another of N77 and N79.

7. The portable electronic device of claim 2, further comprising:
   a printed circuit board disposed in an internal space of the portable electronic device, and comprising a first area and a second area,
   wherein the first RFFE, the fourth RFFE, the first switch, the first antenna, and the fourth antenna are disposed in the first area, and
   wherein the second RFFE, the third RFFE, the second switch, the second antenna, and the third antenna are disposed in the second area.

8. The portable electronic device of claim 7, wherein the printed circuit board further comprises a third area extending from the first area to the second area, and
   wherein at least a portion of the first conductive wiring line is disposed in the third area.

9. The portable electronic device of claim 8, wherein the first conductive wiring line comprises at least one of a coaxial cable, a flexible RF cable (FRC), and a wiring line formed in the third area.

10. A portable electronic device comprising:
    a first antenna, a second antenna, a third antenna, a fourth antenna, a fifth antenna, a sixth antenna, a seventh antenna, and an eighth antenna;
    a first radio frequency front end (RFFE), a second RFFE, a third RFFE, and a fourth RFFE configured to preprocess a radio frequency (RF) signal in a first frequency band;
    a fifth RFFE, a sixth RFFE, a seventh RFFE, and an eighth RFFE configured to preprocess an RF signal in a second frequency band;
    a conductive wiring line;
    a first switch, a second switch, a third switch, and a fourth switch;
    a radio frequency integrated circuit (RFIC) configured to convert the RF signal in the first frequency band input from the first RFFE, the second RFFE, the third RFFE, and the fourth RFFE into a baseband signal, convert a baseband signal into an RF signal in the first frequency band to output the RF signal to the first RFFE, convert the RF signal in the second frequency band input from the fifth RFFE, the sixth RFFE, the seventh RFFE, and the eighth RFFE into a baseband signal, and convert a baseband signal into an RF signal in the second frequency band to output the RF signal to the fifth RFFE; and a communication processor configured to control the first switch, the second switch, the third switch, and the fourth switch, wherein the first switch comprises a (1-1)th terminal connected to the first antenna, a (1-2)th terminal connected to one end of the conductive wiring line, a (1-3)th terminal connected to the fourth antenna, a (1-4)th terminal connected to the first RFFE, a (1-5)th terminal connected to the fourth RFFE, and a (1-6)th terminal connected to the third switch, wherein the second switch comprises a (2-1)th terminal connected to the second antenna, a (2-2)th terminal connected to the third antenna, a (2-3)th terminal connected to the fourth switch, a (2-4)th terminal connected to the second RFFE, a (2-5)th terminal connected to the third RFFE, and a (2-6)th terminal connected to another end of the conductive wiring line, wherein the third switch comprises a (3-1)th terminal connected to the fifth antenna, a (3-2)th terminal connected to the (1-6)th terminal, a (3-3)th terminal connected to the eighth antenna, a (3-4)th terminal connected to the fifth RFFE, and a (3-5)th terminal connected to the eighth RFFE, wherein the fourth switch comprises a (4-1)th terminal connected to the sixth antenna, a (4-2)th terminal connected to the seventh antenna, a (4-3)th terminal connected to the sixth RFFE, a (4-4)th terminal connected to the seventh RFFE, and a (4-5)th terminal connected to the (2-3)th terminal, wherein the communication processor is configured to control the first switch to sequentially connect the (1-1)th terminal, the (1-2)th terminal, and the (1-3)th terminal to the (1-4)th terminal, and control the second switch to sequentially connect the (2-1)th terminal and (2-2)th terminal to the (2-6)th terminal while the (1-2)th terminal is connected to the (1-4)th terminal, when the portable electronic device operates in a first transmission mode for transmitting an SRS to a wireless communication network using the first RFFE, and wherein the communication processor is configured to control the first switch to connect the (1-6)th terminal to the (1-2)th terminal, control the second switch to connect the (2-6)th terminal to the (2-3)th terminal, control the third switch to sequentially connect the (3-1)th terminal, the (3-2)th terminal, and the (3-3)th terminal to the (3-4)th terminal, and control the fourth switch to sequentially connect the (4-1)th terminal and the (4-2)th terminal to the (4-5)th terminal while the (3-4)th terminal is connected to the (3-2)th terminal, the (1-6)th terminal is connected to the (1-2)th terminal, and the (2-6)th terminal is connected to the (2-3)th terminal, when the portable electronic device operates in a second transmission mode for transmitting an SRS to the wireless communication network using the fifth RFFE.

11. The portable electronic device of claim 10, further comprising:

a printed circuit board disposed in an internal space of the portable electronic device, and comprising a first area and a second area, wherein the first RFFE, the fourth RFFE, the fifth RFFE, the eighth RFFE, the first switch, the third switch, the first antenna, the fourth antenna, the fifth antenna, and the eighth antenna are disposed in the first area, and wherein the second RFFE, the third RFFE, the sixth RFFE, the seventh RFFE, the second switch, the fourth switch, the second antenna, the third antenna, the sixth antenna, and the seventh antenna are disposed in the second area.

12. The portable electronic device of claim 10, wherein the first RFFE, the fourth RFFE, and the first switch are integrated into one module, wherein the second RFFE, the third RFFE, and the second switch are integrated into one module, wherein the fifth RFFE, the eighth RFFE, and the third switch are integrated into one module, and wherein the sixth RFFE, the seventh RFFE, and the fourth switch are integrated into one module.

13. A portable electronic device comprising:

a first antenna, a second antenna, a third antenna, and a fourth antenna;

a first radio frequency front end (RFFE), a second RFFE, a third RFFE, and a fourth RFFE configured to preprocess a radio frequency (RF) signal in a first frequency band;

a fifth RFFE, a sixth RFFE, a seventh RFFE, and an eighth RFFE configured to preprocess an RF signal in a second frequency band which is lower than the first frequency band;

a conductive wiring line;

a first diplexer, a second diplexer, a third diplexer, and a fourth diplexer configured to commonly comprise a high pass filter (HPF) which filters out the RF signal in the second frequency band and allows the RF signal in the first frequency band to pass and a low pass filter (LPF) which filters out the RF signal in the first frequency band and allows the RF signal in the second frequency band to pass;

a first switch, a second switch, a third switch, and a fourth switch;

a radio frequency integrated circuit (RFIC) configured to convert the RF signal in the first frequency band input from the first RFFE, the second RFFE, the third RFFE, and the fourth RFFE into a baseband signal, convert a baseband signal into an RF signal in the first frequency band to output the RF signal to the first RFFE, convert the RF signal in the second frequency band input from the fifth RFFE, the sixth RFFE, the seventh RFFE, and the eighth RFFE into a baseband signal, and convert a baseband signal into an RF signal in the second frequency band to output the RF signal to the fifth RFFE; and a communication processor configured to control the first switch, the second switch, the third switch, and the fourth switch, wherein the first diplexer comprises a (1-1)th port disposed between the LPF and the HPF of the first diplexer and connected to the first antenna, a (1-2)th port connected to the third switch, and a (1-3)th port connected to the first switch, the LPF of the first diplexer being positioned between the (1-1)th port and the (1-2)th port, and the HPF of the first diplexer being positioned between the (1-1)th port and the (1-3)th port, wherein the second diplexer comprises a (2-1)th port disposed between the LPF and the HPF of the second diplexer and connected to the second antenna, a (2-2)th port connected to the fourth switch, and a (2-3)th port connected to the second switch, the LPF of the second diplexer being positioned between the (2-1)th port and the (2-2)th port, and the HPF of the second diplexer being positioned between the (2-1)th port and the (2-3)th port, wherein the third diplexer comprises a (3-1)th port disposed between the LPF and the HPF of the third diplexer and connected to the third antenna, a (3-2)th port connected to the fourth switch, and a (3-3)th port connected to the second switch, the LPF of the third diplexer being positioned between the (3-1)th port and the (3-2)th port, and the HPF of the third diplexer being positioned between the (3-1)th port and the (3-3)th port, wherein the fourth diplexer comprises a (4-1)th port disposed between the LPF and the HPF of the fourth diplexer and connected to the fourth antenna, a (4-2)th port connected to the third switch, and a (4-3)th port connected to the first switch, the LPF of the fourth diplexer being positioned between the (4-1)th port and the (4-2)th port, and the HPF of the fourth diplexer being positioned between the (4-1)th port and the (4-3)th port, wherein the first switch comprises a (1-1)th terminal connected to the (1-3)th port, a (1-2)th terminal connected to one end of the conductive wiring line, a (1-3)th terminal connected to the (4-3)th port, a (1-4)th terminal connected to the first RFFE, a (1-5)th terminal connected to the fourth RFFE, and a (1-6)th terminal connected to the third switch, wherein the second switch comprises a (2-1)th terminal connected to the (2-3)th port, a (2-2)th terminal connected to the (3-3)th port, a (2-3)th terminal connected to the fourth switch, a (2-4)th terminal connected to the second RFFE, a (2-5)th terminal connected to the third RFFE, and a (2-6)th terminal connected to another end of the conductive wiring line, wherein the third switch comprises a (3-1)th terminal connected to the (1-2)th port, a (3-2)th terminal connected to the (1-6)th terminal, a (3-3)th terminal connected to the (4-2)th port, a (3-4)th terminal connected to the fifth RFFE, and a (3-5)th terminal connected to the eighth RFFE, wherein the fourth switch comprises a (4-1)th terminal connected to the (2-2)th port, a (4-2)th terminal connected to the (3-2)th port, a (4-3)th terminal connected to the sixth RFFE, a (4-4)th terminal connected to the seventh RFFE, and a (4-5)th terminal connected to the (2-3)th terminal, wherein the communication processor is configured to control the first switch to sequentially connect the (1-1)th terminal, the (1-2)th terminal, and the (1-3)th terminal to the (1-4)th terminal, and control the second switch to sequentially connect the (2-1)th terminal and (2-2)th terminal to the (2-6)th terminal while the (1-2)th terminal is connected to the (1-4)th terminal, when the portable electronic device operates in a first transmission mode for transmitting an SRS to a wireless communication network using the first RFFE, and wherein the communication processor is configured to control the first switch to connect the (1-6)th terminal to the (1-2)th terminal, control the second switch to connect the (2-6)th terminal to the (2-3)th terminal, control the third switch to sequentially connect the (3-1)th terminal, the (3-2)th terminal, and the (3-3)th terminal to the (3-4)th terminal, and control the fourth switch to sequentially connect the (4-1)th terminal and the (4-2)th terminal to the (4-5)th terminal while the (3-4)th terminal is connected to the (3-2)th terminal, the (1-6)th terminal is connected to the (1-2)th terminal, and the (2-6)th terminal is connected to the (2-3)th terminal, when the portable electronic device operates in a second transmission mode for transmitting an SRS to the wireless communication network using the fifth RFFE.

14. The portable electronic device of claim 13, wherein the first RFFE, the fourth RFFE, and the first switch are integrated into one module,
wherein the second RFFE, the third RFFE, and the second switch are integrated into one module,
wherein the fifth RFFE, the eighth RFFE, and the third switch are integrated into one module, and
wherein the sixth RFFE, the seventh RFFE, and the fourth switch are integrated into one module.

15. A portable electronic device comprising:
a first antenna, a second antenna, a third antenna, and a fourth antenna;
a first radio frequency front end (RFFE), a second RFFE, a third RFFE, and a fourth RFFE configured to preprocess a radio frequency (RF) signal in a first frequency band;
a fifth RFFE, a sixth RFFE, a seventh RFFE, and an eighth RFFE configured to preprocess an RF signal in a second frequency band which is different from the first frequency band;
a conductive wiring line;
a first switch, a second switch, a third switch, and a fourth switch;
a radio frequency integrated circuit (RFIC) configured to convert the RF signal in the first frequency band input from the first RFFE, the second RFFE, the third RFFE, and the fourth RFFE into a baseband signal, convert a baseband signal into an RF signal in the first frequency band to output the RF signal to the first RFFE, convert the RF signal in the second frequency band input from the fifth RFFE, the sixth RFFE, the seventh RFFE, and the eighth RFFE into a baseband signal, and convert a baseband signal into an RF signal in the second frequency band to output the RF signal to the fifth RFFE; and
a communication processor configured to control the first switch, the second switch, the third switch, and the fourth switch,
wherein the first switch comprises a (1-1)th terminal connected to the first antenna, a (1-2)th terminal connected to the second switch through the conductive wiring line, a (1-3)th terminal connected to the first RFFE, a (1-4)th terminal connected to the fourth RFFE, and a (1-5)th terminal connected to a third switch,
wherein the second switch comprises a (2-1)th terminal connected to the second antenna, a (2-2)th terminal connected to the fourth switch, a (2-3)th terminal connected to the second RFFE, a (2-4)th terminal connected to the third RFFE, and a (2-5)th terminal connected to the (1-2)th terminal through the conductive wiring line,
wherein the third switch comprises a (3-1)th terminal connected to the (1-5)th terminal, a (3-2)th terminal connected to the fourth antenna, a (3-3)th terminal connected to the fifth RFFE, and a (3-4)th terminal connected to the eighth RFFE,
wherein the fourth switch comprises a (4-1)th terminal connected to the third antenna, a (4-2)th terminal connected to the sixth RFFE, a (4-3)th terminal connected to the seventh RFFE, and a (4-4)th terminal connected to the (2-2)th terminal, wherein the communication processor is configured to control the first switch to sequentially connect the (1-3)th terminal to the (1-1)th terminal, the (1-2)th terminal, and the (1-5)th terminal, control the second switch to sequentially connect the (2-5)th terminal to the (2-1)th terminal and the (2-2)th terminal while the (1-3)th terminal is connected to the (1-2)th terminal, control the fourth switch to connect the (4-1)th terminal to the (4-4)th terminal while the (2-5)th terminal is connected to the (2-2)th terminal, and control the third switch to connect the (3-1)th terminal to the (3-2)th terminal while the (1-3)th terminal is connected to the (1-5)th terminal, when the portable electronic device operates in a first transmission mode for transmitting an SRS to a wireless communication network using the first RFFE, and wherein the communication processor is configured to control the third switch to sequentially connect the (3-3)th terminal to the (3-1)th terminal and the (3-2)th terminal, control the first switch to sequentially connect the (1-5)th terminal to the (1-1)th terminal and the (1-2)th terminal while the (3-3)th terminal is connected to the (3-1)th terminal, control the second switch to sequentially connect the (2-5)th terminal to the (2-1)th terminal and the (2-2)th terminal while the (1-5)th terminal is connected to the (1-2)th terminal, and control the fourth switch to connect the (4-1)th terminal to the (4-4)th terminal while the (2-5)th terminal is connected to the (2-2)th terminal, when the portable electronic device operates in a second transmission mode for transmitting an SRS to the wireless communication network using the fifth RFFE.

* * * * *